United States Patent
Kolbrener et al.

(10) Patent No.: US 10,282,790 B1
(45) Date of Patent: May 7, 2019

(54) SYSTEMS, MEDIA, AND METHODS FOR ENRICHING DATA RECORDS AND ENABLING HISTORICAL DATA REPLAY

(71) Applicant: PROMONTECH LLC, Denver, CO (US)

(72) Inventors: Michael Kolbrener, Boulder, CO (US); Amy Cordova, Aurora, CO (US); Dean Patrick McCall, Parker, CO (US); Zachary William Langley, Frederick, CO (US); Michael Gerard Kazarian, Denver, CO (US); Susan Frances Tobin, Brooklyn, NY (US)

(73) Assignee: PROMONTECH LLC, Denver, CO (US)

( * ) Notice: Subject to any disclaimer, the term of this patent is extended or adjusted under 35 U.S.C. 154(b) by 0 days.

(21) Appl. No.: 15/820,260

(22) Filed: Nov. 21, 2017

Related U.S. Application Data

(60) Provisional application No. 62/503,797, filed on May 9, 2017.

(51) Int. Cl.
*G06Q 40/02* (2012.01)
*G06Q 40/00* (2012.01)
*G06F 16/21* (2019.01)

(52) U.S. Cl.
CPC ........... *G06Q 40/12* (2013.12); *G06F 16/219* (2019.01); *G06Q 40/025* (2013.01)

(58) Field of Classification Search
CPC .................................................. G06Q 40/025
USPC .......................................................... 705/38
See application file for complete search history.

(56) References Cited

U.S. PATENT DOCUMENTS

| | | | |
|---|---|---|---|
| 8,452,699 B2 | 5/2013 | Crooks | |
| 8,498,931 B2 | 7/2013 | Abrahams et al. | |
| 2003/0233316 A1* | 12/2003 | Hu | G06Q 40/02 705/38 |
| 2005/0102229 A1* | 5/2005 | Kemper | G06Q 10/10 705/39 |
| 2006/0004651 A1* | 1/2006 | Corr | G06Q 40/02 705/38 |
| 2007/0011083 A1* | 1/2007 | Bird | G06Q 30/08 705/38 |
| 2007/0208641 A1* | 9/2007 | Smith | G06Q 10/10 705/35 |
| 2014/0067650 A1 | 3/2014 | Gardiner et al. | |
| 2015/0278941 A1 | 10/2015 | Hegarty et al. | |
| 2016/0140654 A1* | 5/2016 | Bhat | G06Q 40/025 705/38 |
| 2017/0046721 A1 | 2/2017 | Miller | |
| 2017/0154314 A1 | 6/2017 | Mones et al. | |

\* cited by examiner

*Primary Examiner* — A. Hunter Wilder
(74) *Attorney, Agent, or Firm* — Wilson Sonsini Goodrich & Rosati

(57) ABSTRACT

Described are methods, systems, and media for enriching data records while preserving data provenance to enable historical data enrichment process replay.

30 Claims, 33 Drawing Sheets

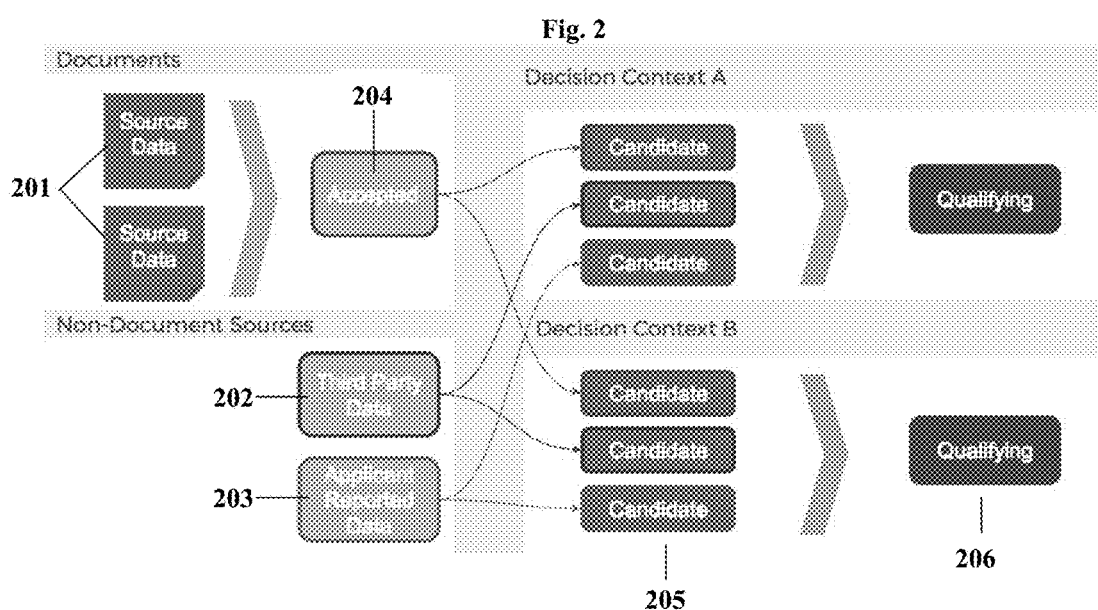

Fig. 3b

```
com.promontech.loanapp.common.documentDescriptor.events.DocumentDescriptorCreatedEvent
{
  "loanTransactionId": "9c9f312a-e3fb-4238-a5ca-1654b0b4e685",
  "documentDescriptorId": "814a2cac-d60c-4781-83e3-46641a254fd7",
  "documentType": "Paystub",
  "documentDescriptorData": {
    "documentData": {
      "totalCurrentEarningAmount": 4014,
      "totalYtdEarningAmount": 4014,
      "yearToDateMonths": 2,
      "startDate": "2017-02-15",
      "endDate": "2017-02-28",
      "employerName": "Panorama Orthopedic Center",
      "employerAddressLine1": "1512 Larimer Street",
      "employerAddressLine2": "Suite 325",
      "employerCity": "Denver",
      "employerState": "CO",
      "employerZip": "80202",
      "paystubEarnings": [
        {
          "ytdHours": 0,
          "earningRate": 50.175,
          "earningType": "REGULAR",
          "payFrequency": "SEMIMONTHLY",
          "periodUnitCount": 1,
          "yearToDateEarning": 15056,
          "periodEarningAmount": 4014
        }
      ]
    }
  }
}
```

Fig. 3c

```
com.promontech.loanapp.common.documentDescriptor.events.CandidateDocumentDescriptorCreatedEvent
{
  "loanTransactionId": "9c9f312a-e9fb-4238-a5ca-1654b8b4e685",
  "documentDescriptorId": "814a2cac-d60c-4781-83e3-46641a254fd7",
  "candidateDocumentDescriptorId": "d6618555-c3e1-4995-b889-d7bda2ce5547",
  "documentType": "Paystub",
  "candidateDocumentData": {
    "candidateDocumentData": {
      "totalCurrentEarningAmount": 4014,
      "totalYtdEarningAmount": 4014,
      "yearToDateMonths": 2,
      "startDate": "2017-02-15",
      "endDate": "2017-02-28",
      "employerName": "Panorama Orthopedic Center",
      "employerAddressLine1": "1512 Larimer Street",
      "employerAddressLine2": "Suite 325",
      "employerCity": "Denver",
      "employerState": "CO",
      "employerZip": "80202",
      "paystubEarnings": [
        {
          "ytdHours": 0,
          "earningRate": 50.175,
          "earningType": "REGULAR",
          "payFrequency": "SEMIMONTHLY",
          "periodUnitCount": 1,
          "yearToDateEarning": 15056,
          "periodEarningAmount": 4014
        }
      ]
    }
  }
}
```

Fig. 3d

```
com.promontech.loanapp.common.documentDescriptor.events.QualifyingDocumentDescriptorCreatedEvent
{
  "loanTransactionId": "9c9f312a-e9fb-4230-a5ca-185468b4e885",
  "documentDescriptorId": "814a2cac-d60c-4781-83e3-46641a254fd7",
  "qualifyingDocumentDescriptorId": "a6618555-c3e1-4995-b889-d7bda2ce5547",
  "documentType": "Paystub",
  "qualifyingDocumentData": {
    "qualifyingDocumentData": {
      "totalCurrentEarningAmount": "814a2cac-d60c-4781-83e3-46641a254fd7",
      "totalYtdEarningAmount": "814a2cac-d60c-4781-83e3-46641a254fd7",
      "yearToDateMonths": "814a2cac-d60c-4781-83e3-46641a254fd7",
      "startDate": "814a2cac-d60c-4781-83e3-46641a254fd7",
      "endDate": "814a2cac-d60c-4781-83e3-46641a254fd7",
      "employerName": "814a2cac-d60c-4781-83e3-46641a254fd7",
      "employerAddressLine1": "814a2cac-d60c-4781-83e3-46641a254fd7",
      "employerAddressLine2": "814a2cac-d60c-4781-83e3-46641a254fd7",
      "employerCity": "814a2cac-d60c-4781-83e3-46641a254fd7",
      "employerState": "814a2cac-d60c-4781-83e3-46641a254fd7",
      "employerZip": "814a2cac-d60c-4781-83e3-46641a254fd7",
      "paystubEarnings": [
        {
          "ytdHours": "814a2cac-d60c-4781-83e3-46641a254fd7",
          "earningRate": "814a2cac-d60c-4781-83e3-46641a254fd7",
          "earningType": "814a2cac-d60c-4781-83e3-46641a254fd7",
          "payFrequency": "814a2cac-d60c-4781-83e3-46641a254fd7",
          "periodUnitCount": "814a2cac-d60c-4781-83e3-46641a254fd7",
          "yearToDateEarning": "814a2cac-d60c-4781-83e3-46641a254fd7",
          "periodEarningAmount": "814a2cac-d60c-4781-83e3-46641a254fd7"
        }
      ]
    }
  }
}
```

Fig. 5b

```
com.promontech.loanapp.common.documentDescriptor.events.QualifyingDocumentDescriptorCreatedEvent
{
  "loanTransactionId": "9c9f312a-e9fb-4238-a5ca-1654b8b4e685",
  "documentDescriptorId": "814a2cac-d60c-4781-83e3-46641a254fd7",
  "qualifyingDocumentDescriptorId": "d6618555-c3e1-4995-b889-d7bda2ce5547",
  "documentType": "Paystub",
  "qualifyingDocumentData": {
    "qualifyingDocumentData": {
      "totalCurrentEarningAmount": "814a2cac-d60c-4781-83e3-46641a254fd7",
      "totalYtdEarningAmount": "814a2cac-d60c-4781-83e3-46641a254fd7",
      "yearToDateMonths": "814a2cac-d60c-4781-83e3-46641a254fd7",
      "startDate": "814a2cac-d60c-4781-83e3-46641a254fd7",
      "endDate": "814a2cac-d60c-4781-83e3-46641a254fd7",
      "employerName": "814a2cac-d60c-4781-83e3-46641a254fd7",
      "employerAddressLine1": "e642f5d9-e8c9-4870-8d0b-6479118f102c",
      "employerAddressLine2": "814a2cac-d60c-4781-83e3-46641a254fd7",
      "employerCity": "814a2cac-d60c-4781-83e3-46641a254fd7",
      "employerState": "e642f5d9-e8c9-4870-8d0b-6479118f102c",
      "employerZip": "814a2cac-d60c-4781-83e3-46641a254fd7",
      "paystubEarnings": [
        {
          "ytdHours": "814a2cac-d60c-4781-83e3-46641a254fd7",
          "earningRate": "814a2cac-d60c-4781-83e3-46641a254fd7",
          "earningType": "814a2cac-d60c-4781-83e3-46641a254fd7",
          "payFrequency": "814a2cac-d60c-4781-83e3-46641a254fd7",
          "periodUnitCount": "814a2cac-d60c-4781-83e3-46641a254fd7",
          "yearToDateEarning": "814a2cac-d60c-4781-83e3-46641a254fd7",
          "periodEarningAmount": "814a2cac-d60c-4781-83e3-46641a254fd7"
        }
      ]
    }
  }
}
```

```
com.promontech.loanapp.common.liability.events.CandidateLiabilityCreatedEvent {
    "sourceData": {
        "sourceDataType": "STATED"
    },
    "liabilityAttributes": {
        "liabilityAccountId": "3563",
        "liabilityType": "INSTALLMENT",
        "liabilityUnpaidBalanceAmount": 2500.00,
        "liabilityMonthlyPaymentAmount": 120.00,
        "liabilityRemainingTermMonthsCount": 21,
        "liabilityPayoffIndicator": false,
        "liabilityPayoffWithCurrentAssetsIndicator": false,
        "liabilityPaidDownAmount": 0.00,
        "liabilityAccountToBeClosedIndicator": false
    },
    "liabilityHolderInformation": {
        "liabilityHolderName": "Mountain Bank"
    },
    "liabilityId": "73661bea-0d6d-445e-8c61-4c54e80f2f06",
    "loanTransactionId": "a2aa029c-d7ef-4bfb-b885-522a46500cb4",
    "candidateLiabilityId": "9fc598da-b508-48ea-ac5d-d4d891ca688f"
}
```

Fig. 7c

```
com.promontech.loanapp.common.liability.events.QualifyingLiabilityCreatedEvent {
    "qualifyingLiabilityId": "247df1dd-259d-43cf-bfc3-d6dd3c633ffc",
    "liabilityId": "73661bea-0d6d-445e-8c61-4c54e80f2f06",
    "loanTransactionId": "a2aa029c-d7ef-4bfb-b885-522a46500cb4",
    "qualifyingLiabilityValueObject": {
        "holderName": "9fc598da-b508-48ea-ac5d-d4d891ca688f",
        "accountId": "9fc598da-b508-48ea-ac5d-d4d891ca688f",
        "unpaidBalance": "9fc598da-b508-48ea-ac5d-d4d891ca688f",
        "monthlyPayment": "9fc598da-b508-48ea-ac5d-d4d891ca688f"
    }
}
```

```
com.promontech.factory.decisioning.common.creditreport.events.CreditLiabilityReportedEvent
{
    "creditReportId": "7dcd0749-4d12-4024-93c1-2bc894127058",
    "applicantId": "89fcf9ba-9757-43e0-9070-2bb76ebf9516",
    "tenantId": "5f47cf9e-6c62-4267-822a-a4fe3e81a100",
    "loanTransactionId": "a2aa029c-d7ef-4bfb-b885-522a46500cb4",
    "creditReportLiabilityId": "a37663cf-0462-433b-bca4-44ad6e774bde",
    "creditLiability": {
        "liabilityId": "73561bea-0d6d-445e-8c61-4c54e00f2f00",
        "creditLiabilityId": "65b5d2af-a8f8-493a-aa85-a0eaf8faeadc",
        "applicantId": "eb2c5e19-902d-4530-b652-713358la6251",
        "creditFileId": "34b982f5-d04a-40ae-aa0c-2af42bffae79",
        "creditTradeReferenceId": "a5513602-5e6c-44c7-a7f2-749caf8a676e",
        "accountClosedDate": "",
        "accountIdentifier": "3563A019732",
        "accountOpenedDate": "06/20/10",
        "accountOwnershipType": "INDIVIDUAL",
        "accountReportedDate": "01/30/17",
        "accountBalanceDate": "01/30/17",
        "accountStatusDate": "01/30/17",
        "accountStatusType": "INDIVIDUAL",
        "accountType": "INSTALLMENT",
        "consumerDisputeIndicator": false,
        "creditLimitAmount": 00.00,
        "derogatoryDataIndicator": false,
        "highCreditAmount": 2600.00,
        "highBalanceAmount": 2600.00,
        "lastActivityDate": "01/30/17",
        "monthlyPaymentAmount": 123.00,
        "monthsReviewedCount": 3,
        "termsDescription": "Standard",
        "termsMonthsCount": 21,
        "unpaidBalanceAmount": 2600.00,
        "creditBusinessType": "CONSUMER",
        "creditCounselingIndicator": false,
        "creditLoanType": "CONSUMER",
        "creditorName": "MB",
        "creditRating": {
            "code": "ABC",
            "type": "CONSUMER"
        },
        "lateCount": {
            "_30Days": 0,
            "_60Days": 0,
            "_90Days": 0,
            "_120Days": 0
        },
        "paymentPattern": {
            "date": "",
            "startDate": "06/20/10"
        },
        "creditComments": [{
            "code": "Bravo",
            "reportedDate": "01/30/17",
            "sourceType": "EQUIFAX",
            "type": "BUREAU_REMARKS",
            "text": "Pretty good"
        }],
        "creditRepositories": [{
            "sourceType": "MERGED_DATA",
            "subscriberCode": "secret"
        }],
        "sourceData": {
            "sourceDataType": "CREDIT_REPORT",
            "sourceRootId": "",
            "sourceId": ""
        }
    }
}
```

```
com.promontech.factory.decisioning.common.creditreport.events.CreditLiabilityAllocatedEvent
{
    "creditReportId": "7dcd0749-4d12-4024-93c1-2bc89412f058",
    "loanTransactionId": "a2aa029c-d7ef-4bfb-b885-522a46500cb4",
    "liabilityId": "73661bea-0d6d-445e-8c61-4c54e80f2f06",
    "sourceData": {
        "sourceDataType": "CREDIT_REPORT",
        "sourceRootId": "eeb57234-9741-4dc3-bdd3-3ba0fbcb6ae1", "sourceId": "90452573-6c6d-42d8-b600-08e51433abc6"
    }
}
```

Fig. 10c

```
com.promontech.loanapp.common.liability.events.CandidateLiabilityCreatedEvent {
    "sourceData": {
        "sourceDataType": "CREDIT_REPORT_LIABILITY",
        "sourceRootId": "e52851cf-11d9-4ca4-b655-987afdfdc021",
        "sourceId": "4e6a5a93-3b8e-43e4-9166-547b991fd407"
    },
    "liabilityAttributes": {
        "liabilityAccountId": "3563A019732",
        "liabilityType": "INSTALLMENT",
        "liabilityUnpaidBalanceAmount": 2600.00,
        "liabilityMonthlyPaymentAmount": 123.00,
        "liabilityRemainingTermMonthsCount": 21,
        "liabilityPayoffIndicator": false,
        "liabilityPayoffWithCurrentAssetsIndicator": false,
        "liabilityPaidDownAmount": 0.00,
        "liabilityAccountToBeClosedIndicator": false
    },
    "liabilityHolderInformation": {
        "liabilityHolderName": "MB"
    },
    "loanTransactionId": "a2aa029c-d7ef-4bfb-b885-522a46500cb4",
    "candidateLiabilityId": "87cb4c24-e2e3-497e-8e03-56bc91b4c03b"
}
```

Fig. 11b

```
com.promontech.loanapp.common.liability.events.QualifyingLiabilityCreatedEvent {
    "qualifyingLiabilityId": "95251114-06b1-4eb7-9ef4-2ef4b150fdc0",
    "liabilityId": "73661bea-0d6d-445e-8c61-4c54e80f2f06",
    "loanTransactionId": "a2aa029c-d7ef-4bfb-b885-522a46500cb4",
    "qualifyingLiabilityValueObject": {
        "holderName": "9fc598da-b508-48ea-ac5d-d4d891ca688f",
        "accountId": "87cb4c24-e2e3-497e-8e03-56bc91b4c03b",
        "unpaidBalance": "87cb4c24-e2e3-497e-8e03-56bc91b4c03b",
        "monthlyPayment": "87cb4c24-e2e3-497e-8e03-56bc91b4c03b"
    }
}
```

SYSTEMS, MEDIA, AND METHODS FOR ENRICHING DATA RECORDS AND ENABLING HISTORICAL DATA REPLAY

CROSS-REFERENCE TO RELATED APPLICATIONS

This application claims the benefit of U.S. Application Ser. No. 62/503,797, filed May 9, 2017, the entire contents of which are hereby incorporated by reference.

BACKGROUND OF THE INVENTION

In the mortgage industry, the combination of the regulatory compliance landscape and the risk associated with purchasing a loan usually results in multiple rounds of underwriting throughout the loan lifecycle. Prior to a loan being closed and an applicant's home purchase or refinance funded, a loan is underwritten. An "underwriter" reviews applicant financial profile information in order to "decision" a loan. Following an underwriter's credit evaluation of an Applicant, the applicant's financial profile is then partially re-underwritten for Quality Control, and possibly again for Compliance and Risk Review.

SUMMARY OF THE INVENTION

A mortgage loan is a two-part transaction: 1) A lender provides funds to an applicant; and 2) the final loan transaction or financial instrument is presented to the Secondary Market for sale. When the loan is shopped on the secondary market, the investor likely completes a partial or full re-underwrite of the loan to mitigate the risk of the purchase. To further mitigate risk in the private securitization market and to protect bondholders, the issuer hires a third-party reviewer, based on rating agency requirements, for additional underwriting. Often, the process is repeated each time the loan is offered for sale. The re-underwrite effort is repeated frequently and requires the reproduction of loan data that is often incomplete or disorganized (e.g., reconstructed from packages of documents) stored in systems that are separated and many times removed from the original underwriting effort. Loan Origination Systems (LOS) that are currently on the market provide insufficient ability to track key data elements used in the original decisioning and in subsequent reviews. For example, the result of a calculation is tracked, but the calculation itself may have been performed outside the LOS in a spreadsheet or even on paper. The documentation that tracks how the number was calculated, which data sets and documents were used, and other key factors can be lost. Existing loan origination systems fail to track these extra-system calculation components, and fail to capture the complex steps and relationships involved in the calculation process and component data. Each calculation requires various inputs and comparisons and requires the selection of one of several possible calculation methodologies. The selection of the source data and methodologies of these calculations sometimes require the underwriter or reviewer to make subjective decisions. The failure of most loan origination systems to track the data and reasoning behind each decision renders these decisions virtually irreproducible and thus valueless for future reviewers and underwriters.

Data integrity issues further complicate this problem. In addition to errors that can be introduced by manual data entry, automated data capture presents a technology-sourced problem. Optical Character Recognition (OCR) technology allows for the automated extraction of data from documents that can then be distilled, presented, and used in the loan decision process. The accuracy of the data is dependent in large part on the image quality of the document that is introduced to the system via scan or other imaging technology. The current state of OCR technology does not accommodate the level of image quality control to the extent that is required to fully optimize data extraction. The complexity of rules configuration for the non-structured documents that are characteristic of the mortgage industry means that, all else being equal, even perfect-quality images can yield incomplete or inaccurate data.

Current LOSs track audit history, at best, by writing updates to a static log. This log tracks what data was changed, when it was changed, and by what user, but it results in the data in the field being tracked having been overwritten with the new value. In this case, the data is mutable and it is only the change log that is tracked. In other words, there are breadcrumbs that indicate a change may have been made but the history of the values change from "x" to "y" is lost.

As in other industries, the application of technology in the mortgage industry is intended to automate certain processes in order to increase efficiency and decrease the per loan cost to originate. The particular challenge in the mortgage industry is that human underwriters must sometimes make (from the perspective of systemic automation) subjective decisions that factor in myriad considerations from across the loan file. Since all of those considerations exist in data, it stands that many or all of them can be automated given adequate data structure in which to track decisions that currently occur outside of LOS systems. This ability to write rules and logic to guide the system to make decisions (and subsequently to automate them) is completely dependent on the ability of the system to track every interconnected piece of data and, most importantly, the relationships among these data. It also theoretically depends on the ability of the system to learn from human decisions that are atomically tracked.

Described herein are applications and software architectures based on a framework that embodies the Command Query Responsibility Segregation (CQRS) and Event Sourcing design pattern. CQRS with Event Sourcing allows the applications to write each event to an immutable store that creates a "ledger" of loan activities, and to separate the models for update and display, distinct from traditional Create/Read/Update/Delete (CRUD) models. The addition of event sourcing captures atomic-level changes to the event store rather than maintaining a "moment-in-time" full audit state. Instead of representing the current state, the current state is derived from a log of all states that have ever existed. This is integral to the implicit audit capability of the system; it allows events to be re-played rather than reproduced from a static log. The source of record is never changed; only the projection of the data reflects any change. This structure forms the foundation of the granular data-tracking that will facilitate the reproducibility of decisions and facilitate automation.

The Source/Accepted/Candidate/Qualifying data described herein is cycled through a four-step verification process, with the dual purposes of guaranteeing the quality of the data and setting up the foundation on which automation can be built. Source data is extracted from documents or received directly from a third-party source. In the latter case, there is some level of data quality guarantee that is implicit in the source, and in most cases it can reasonably be moved to the next step of refining. In the case of documents, however, the data quality is dependent on the image quality of the document and the overlying configuration of the OCR engine extracting the data. In order for the data set to be used to create a qualifying set of data for the final loan decision, it requires further work. To promote data to an "Accepted" state, the user interface allows the user to select the best values for like documents to create a "golden record" that can be used in downstream calculations.

Maintaining data quality and preserving data provenance is beneficial in many respects. Not only can all levels of data be passed between unaffiliated underwriters and independently reviewed, but the data can also be used in changing regulatory environments. Because the source of the data, and all other provenance for the data, is preserved, an underwriter can restart at the source documents and make decisions according to a different set of regulations.

In one aspect, disclosed herein are computer-implemented methods of enriching data records while preserving data provenance to enable historical data replay, the method comprising: receiving a plurality of source data records, each source data record comprising multiple data fields, each source data record comprising data fields at least partially overlapping with the data fields of at least one other source data record, each source data record comprising a unique source data record identifier; selecting a plurality of data fields from among the plurality of source data records to compile one or more accepted data records, each selected data field in an accepted data record comprising the best known data from among the plurality of source data records and retaining an association with a relevant source data record identifier and a reason for its selection, each accepted data record comprising a unique accepted data record identifier; selecting a plurality of data fields from among the one or more accepted data records to create one or more candidate data records, each selected data field in a candidate data record retaining an association with a relevant accepted data record identifier and a reason for its selection, each candidate data record comprising a unique candidate data record identifier; selecting a plurality of data fields from among the one or more candidate data records to create one or more qualifying data records, each selected data field in a qualifying data record retaining an association with a relevant candidate data record identifier and a reason for its selection; and logging the data records and the selection events to create a ledger allowing the process to be replicated under alternative data record selection criteria without loss of selection options. In some embodiments, the source data records pertain to a financial asset. In other embodiments, the source data records pertain to an income. In yet other embodiments, the source data records pertain to a financial liability. In yet other embodiments, the source data records pertain to a property. In some embodiments, the selecting of a plurality of data fields from among the plurality of source data records to create one or more accepted data records is performed by a human. In other embodiments, the selecting of a plurality of data fields from among the plurality of source data records to compile one or more accepted data records is performed by application of a set of pre-configured rules. In some embodiments, the creation of the one or more candidate data records further comprises performing one or more calculations using the data fields selected from among the one or more accepted data records. In some embodiments, the creation of the one or more qualifying data records further comprises performing one or more calculations using the data fields selected from among the one or more candidate data records. In a particular embodiment, the one or more qualifying records are used in a loan origination process. In some embodiments, the ledger comprises a compliance audit record. In some embodiments, the method is performed by a distributed computing application allowing enrichment of the same plurality of data records by multiple processes in parallel. In some embodiments, the method is performed by a distributed computing application allowing enrichment of multiple pluralities of data records in parallel. In some embodiments, the method further comprises utilizing the ledger of data records and selection events to reverse or recapitulate a completed data record enrichment process.

In another aspect, disclosed herein are computer-implemented systems comprising: a digital processing device comprising: at least one processor, an operating system configured to perform executable instructions, a memory, and a computer program including instructions executable by the digital processing device to create a data record enrichment application comprising: a software module receiving a plurality of source data records, each source data record comprising multiple data fields, each source data record comprising data fields at least partially overlapping with the data fields of at least one other source data record, each source data record comprising a unique source data record identifier; a software module allowing selection of a plurality of data fields from among the plurality of source data records to compile one or more accepted data records, each selected data field in an accepted data record comprising the best known data from among the plurality of source data records and retaining an association with a relevant source data record identifier and a reason for its selection, each accepted data record comprising a unique accepted data record identifier; a software module allowing selection of a plurality of data fields from among the one or more accepted data records to create one or more candidate data records, each selected data field in a candidate data record retaining an association with a relevant accepted data record identifier and a reason for its selection, each candidate data record comprising a unique candidate data record identifier; a software module allowing selection of a plurality of data fields from among the one or more candidate data records to create one or more qualifying data records, each selected data field in a qualifying data record retaining an association with a relevant candidate data record identifier and a reason for its selection; and a software module logging each data record and each selection event to create a ledger allowing the process to be replicated under alternative data record selection criteria without loss of selection options. In some embodiments, the source data records pertain to a financial asset. In other embodiments, the source data records pertain to an income. In yet other embodiments, the source data records pertain to a financial liability. In yet other embodiments, the source data records pertain to a property. In some embodiments, the selecting of a plurality of data fields from among the plurality of source data records to create one or more accepted data records is performed by a human. In other embodiments, the selecting of a plurality of data fields from among the plurality of source data records to compile one or more accepted data records is performed by application of a set of pre-configured rules. In some embodiments, the creation of the one or more candidate data records further comprises performing one or more calculations using the data fields selected from among the one or more accepted data records. In some embodiments, the creation of the one or more qualifying data records further comprises performing one or more calculations using the data fields selected from among the one or more candidate data records. In a particular embodiment, the data record enrichment application is implemented as part of a loan origination application and the one or more qualifying records are used in a loan origination process. In some embodiments, the ledger comprises an audit record. In some embodiments, the data record enrichment application is implemented by a distributed computing application allowing enrichment of the same plurality of data records by multiple processes in parallel. In some embodiments, the data record enrichment application is implemented by a distributed computing application allowing enrichment of multiple pluralities of data records in parallel. In some embodiments, the application further comprises a software module utilizing the ledger of data records and selection events to reverse or recapitulate a completed data record enrichment process.

In yet another aspect, disclosed herein are non-transitory computer-readable storage media encoded with a computer program including instructions executable by a processor to create a data record enrichment application comprising: a software module receiving a plurality of source data records, each source data record comprising multiple data fields, each source data record comprising data fields at least partially overlapping with the data fields of at least one other source data record, each source data record comprising a unique source data record identifier; a software module allowing selection of a plurality of data fields from among the plurality of source data records to compile one or more accepted data records, each selected data field in an accepted data record comprising the best known data from among the plurality of source data records and retaining an association with a relevant source data record identifier and a reason for its selection, each accepted data record comprising a unique accepted data record identifier; a software module allowing selection of a plurality of data fields from among the one or more accepted data records to create one or more candidate data records, each selected data field in a candidate data record retaining an association with a relevant accepted data record identifier and a reason for its selection, each candidate data record comprising a unique candidate data record identifier; a software module allowing selection of a plurality of data fields from among the one or more candidate data records to create one or more qualifying data records, each selected data field in a qualifying data record retaining an association with a relevant candidate data record identifier and a reason for its selection; and a software module logging each data record and each selection event to create a ledger allowing the process to be replicated under alternative data record selection criteria without loss of selection options. In some embodiments, the source data records pertain to a financial asset. In other embodiments, the source data records pertain to an income. In yet other embodiments, the source data records pertain to a financial liability. In yet other embodiments, the source data records pertain to a property. In some embodiments, the selecting of a plurality of data fields from among the plurality of source data records to create one or more accepted data records is performed by a human. In other embodiments, the selecting of a plurality of data fields from among the plurality of source data records to compile one or more accepted data records is performed by application of a set of pre-configured rules. In some embodiments, the creation of the one or more candidate data records further comprises performing one or more calculations using the data fields selected from among the one or more accepted data records. In some embodiments, the creation of the one or more qualifying data records further comprises performing one or more calculations using the data fields selected from among the one or more candidate data records. In a particular embodiment, the data record enrichment application is implemented as part of a loan origination application and the one or more qualifying records are used in a loan origination process. In some embodiments, the ledger comprises an audit record. In some embodiments, the data record enrichment application is implemented by a distributed computing application allowing enrichment of the same plurality of data records by multiple processes in parallel. In some embodiments, the data record enrichment application is implemented by a distributed computing application allowing enrichment of multiple pluralities of data records in parallel. In some embodiments, the application further comprises a software module utilizing the ledger of data records and selection events to reverse or recapitulate a completed data record enrichment process.

BRIEF DESCRIPTION OF THE DRAWINGS

A better understanding of the features and advantages of the present invention will be obtained by reference to the following detailed description that sets forth illustrative embodiments and the accompanying drawings of which:

FIG. 2 shows the process of obtaining qualifying records to be used in the loan decision process;

FIG. 3b shows the event payload of the document descriptor that is created during the process depicted in FIG. 3a;

FIG. 3c shows the event payload of an Accepted document descriptor;

FIG. 3d show the event payload of a Qualifying document descriptor;

FIG. 5b shows the event payload of the document descriptor that is created for the event of FIG. 5a;

FIG. 6 shows an example of accepted selections following conflict resolution;

FIG. 7b shows the event payload of the applicant reported Candidate record that is created;

FIG. 7c shows the event payload of the applicant reported Qualifying record that is created;

FIG. 8a shows an example of the graphical user interface presented when the data input from a common credit report returns new liability records;

FIG. 8b shows the event payload created by inputting the credit report data exemplified in FIG. 8a;

FIG. 10a shows an example of the user moving one of the unallocated liabilities to be an alternative candidate for an existing liability;

FIG. 10b shows the event payload created from indexing Candidate liability;

FIG. 10c shows the event payload from creating a new Candidate with allocated liability data;

FIG. 11b shows the event payload created from the Qualified record update;

FIG. 12 shows the history view collapsed to the summary view wherein the qualifying record has been updated;

FIG. 14 shows an example of the graphical user interface presented when the preliminary qualifying income is calculated based on the data reported by the applicant;

FIG. 16 shows an example of the graphical user interface presented when the user has associated paystub and W2 data to support the income being evaluated;

FIG. 17 shows an example of the graphical user interface presented when the user selects the "Calculate" button next to the income to open a calculator modal;

FIG. 18 shows an example of the graphical user interface presented when the user has updated the qualifying selection to an alternative candidate;

FIG. 19 shows an example of the Employment and Income page, wherein the qualifying income calculation has been updated to reflect the new candidate selection;

DETAILED DESCRIPTION OF THE INVENTION

Figure 1:
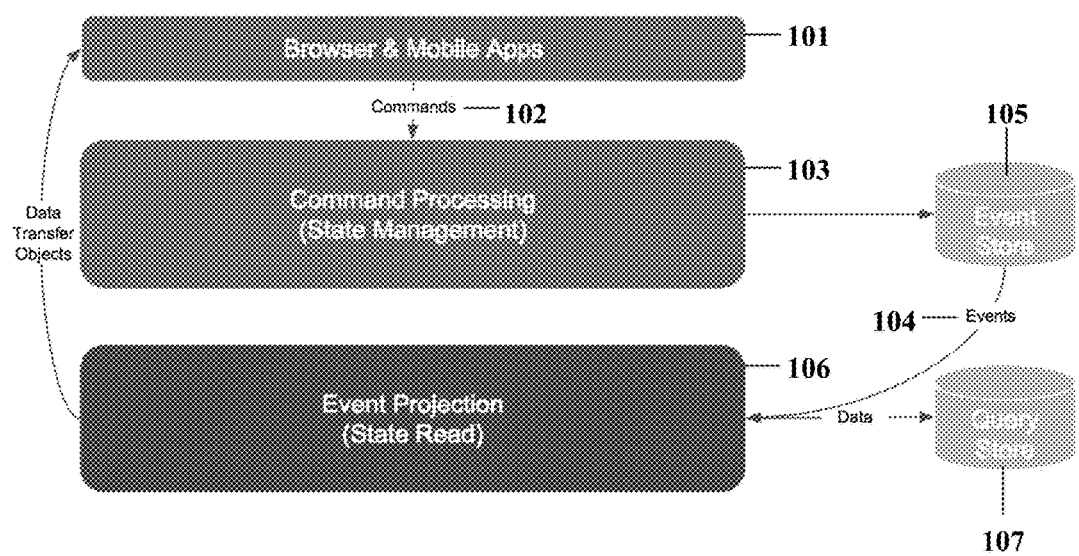
FIG. 1 shows the architecture of the application and the functionality of the stack.

Described herein, in certain embodiments, are computer-implemented methods of enriching data records while preserving data provenance to enable historical data replay, the method comprising: receiving a plurality of source data records, each source data record comprising multiple data fields, each source data record comprising data fields at least partially overlapping with the data fields of at least one other source data record, each source data record comprising a unique source data record identifier; selecting a plurality of data fields from among the plurality of source data records to compile one or more accepted data records, each selected data field in an accepted data record comprising the best known data from among the plurality of source data records and retaining an association with a relevant source data record identifier and a reason for its selection, each accepted data record comprising a unique accepted data record identifier; selecting a plurality of data fields from among the one or more accepted data records to create one or more candidate data records, each selected data field in a candidate data record retaining an association with a relevant accepted data record identifier and a reason for its selection, each candidate data record comprising a unique candidate data record identifier; selecting a plurality of data fields from among the one or more candidate data records to create one or more qualifying data records, each selected data field in a qualifying data record retaining an association with a relevant candidate data record identifier and a reason for its selection; and logging the data records and the selection events to create a ledger allowing the process to be replicated under alternative data record selection criteria without loss of selection options.

Also described herein, in certain embodiments, are computer-implemented systems comprising: a digital processing device comprising: at least one processor, an operating system configured to perform executable instructions, a memory, and a computer program including instructions executable by the digital processing device to create a data record enrichment application comprising: a software module receiving a plurality of source data records, each source data record comprising multiple data fields, each source data record comprising data fields at least partially overlapping with the data fields of at least one other source data record, each source data record comprising a unique source data record identifier; a software module allowing selection of a plurality of data fields from among the plurality of source data records to compile one or more accepted data records, each selected data field in an accepted data record comprising the best known data from among the plurality of source data records and retaining an association with a relevant source data record identifier and a reason for its selection, each accepted data record comprising a unique accepted data record identifier; a software module allowing selection of a plurality of data fields from among the one or more accepted data records to create one or more candidate data records, each selected data field in a candidate data record retaining an association with a relevant accepted data record identifier and a reason for its selection, each candidate data record comprising a unique candidate data record identifier; a software module allowing selection of a plurality of data fields from among the one or more candidate data records to create one or more qualifying data records, each selected data field in a qualifying data record retaining an association with a relevant candidate data record identifier and a reason for its selection; and a software module logging each data record and each selection event to create a ledger allowing the process to be replicated under alternative data record selection criteria without loss of selection options.

Also described herein, in certain embodiments, are non-transitory computer-readable storage media encoded with a computer program including instructions executable by a processor to create a data record enrichment application comprising: a software module receiving a plurality of source data records, each source data record comprising multiple data fields, each source data record comprising data fields at least partially overlapping with the data fields of at least one other source data record, each source data record comprising a unique source data record identifier; a software module allowing selection of a plurality of data fields from among the plurality of source data records to compile one or more accepted data records, each selected data field in an accepted data record comprising the best known data from among the plurality of source data records and retaining an association with a relevant source data record identifier and a reason for its selection, each accepted data record comprising a unique accepted data record identifier; a software module allowing selection of a plurality of data fields from among the one or more accepted data records to create one or more candidate data records, each selected data field in a candidate data record retaining an association with a relevant accepted data record identifier and a reason for its selection, each candidate data record comprising a unique candidate data record identifier; a software module allowing selection of a plurality of data fields from among the one or more candidate data records to create one or more qualifying data records, each selected data field in a qualifying data record retaining an association with a relevant candidate data record identifier and a reason for its selection; and a software module logging each data record and each selection event to create a ledger allowing the process to be replicated under alternative data record selection criteria without loss of selection options.

Certain Definitions

The term "accepted" refers to the data selected to represent a like-source record group. If there are multiple versions of a document of the same type, date, and other identifying data, then one set of data will be selected to be used as the "golden" version of that document set. The term "accepted" applies specifically to document data.

The term "Borrower Wallet" refers to a secure, consumer-facing application where lenders and borrowers can interact, with the multiple purposes of (1) transmitting information required for the loan inquiry or application from the borrower to the loan officer or lender, (2) facilitating communication between the borrower and his/her loan production team, and (3) educating the borrower on the mortgage loan process.

The term "candidate" refers to a data record which, in whole or in part, may be promoted to a qualified record. This record will be some subset of an accepted record that is applicable to a particular loan context, e.g., liability, asset, income, or property.

The term "command" refers to a combination of expressed intent (which describes what you want to be done) as well as the information required to undertake action based on that intent. A state change within an application is initiated by a command. The term is to be understood within the field of application development.

The term "document image" refers to a digital representation of a physical document. The document image is introduced into the system via scan, email, or photograph.

The term "event" refers to code objects that describe a factual occurrence in the application. As such, an event represents an immutable representation of a fact. When an important action occurs in the application, it will be captured as an event such that the history of all important actions are preserved to allow for replication of the data enrichment process and auditing.

The term "factory" refers to the portion of the loan process that occurs in a Loan Origination System (LOS). Factory workers include Loan Officers, Processors, Underwriters, Closers, and various data specialists who assist in the end-to-end processing of a mortgage loan file.

The term "optical character recognition" or "OCR" refers to the conversion of text images into machine-encoded text via the application of rules in a configurable automated process.

The term "payload" refers to the conversion of text images into machine-encoded text via the application of rules in a configurable automated process.

The term "qualifying" or "qualified" is meant to be understood within the field of mortgages, and refers to enriched data that is the output of the subject matter described herein and typically used in the final underwriting decision on a loan. A qualifying record refers to the enriched data plus any other data referenced within the line item that was selected to represent the record. In various embodiments, a qualifying record is approved, adjusted, and/or calculated and specifies an income, asset, liability, and/or property value.

The term "source" refers to the raw data retrieved, point by point, from a document image. This data set should exactly replicate the values represented on the document image.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Data Enrichment

Described herein are applications and software architectures based on a framework that allows developers to create Java applications based on Command Query Responsibility Segregation (CQRS) and Event Sourcing design pattern. It is built on an open-source framework that has been implemented in various tech stacks over the last decade, but the application of these principles to the mortgage industry is unique. CQRS with Event Sourcing allows us to write each event to an immutable store that creates a "ledger" of loan activities, and to separate the models for update and display, distinct from traditional Create/Read/Update/Delete (CRUD) models. The addition of event sourcing captures atomic-level changes to the event store rather than maintaining a "moment-in-time" full audit state. Instead of representing the current state, the current state is derived from a log of all states that have ever existed. This is integral to the implicit audit capability of the system; it allows events to be re-played rather than reproduced from a static log. The source of record is never changed; only the projection of the data reflects any change. This structure forms the foundation of the granular data-tracking that will facilitate the reproducibility of decisions and facilitate automation.

Lineage is shown through the usage of the payload within the events. Each event is accompanied by a payload: a package of data that represents the current state. That payload is retained in the event store and can be projected to the front end to be displayed in the UI. FIG. 1 illustrates the architecture that facilitates this functionality. Applications (101) ask the system to perform an action by issuing a command (102). Command Processing (103) validates the request and performs the required action. When a command is successfully processed, command processing will create a series of events (104). Since the command was successful, the events cannot be disputed and are immutable. The incremental immutable events become the source of record (105) for future commands. The events can also be projected (106) to any number of read-only query stores (107). These query stores can be designed to be purpose-driven, e.g., to display information in the user interface, to perform near-real-time analytics, or for operational intelligence. This separation allows the command processing and query architectures to be scaled and altered separately.

The data is cycled through a four-step verification process with the dual purposes of guaranteeing the quality of the data and setting up the foundation on which automation can be built.

Described herein are applications and software architectures, as shown in FIG. 2, in which Source data (201) is introduced to the system by way of OCR technology, a third party (202), or hand-keying (203) by a human operator. In the case of multiple versions of the same source, data points from one or multiple sources are selected to comprise a representative data set, or the "best known data" for that particular unique document. From there, accepted document data records (204) can be used in whole or part to support candidates (205) for qualifying in several loan contexts (e.g., income, asset, liability, or property). Finally, a user may select from the available candidates to create one qualifying record (206) that will be used in the final loan decision process.

Step 1—Source Data is Introduced into the System

Figure 3A:
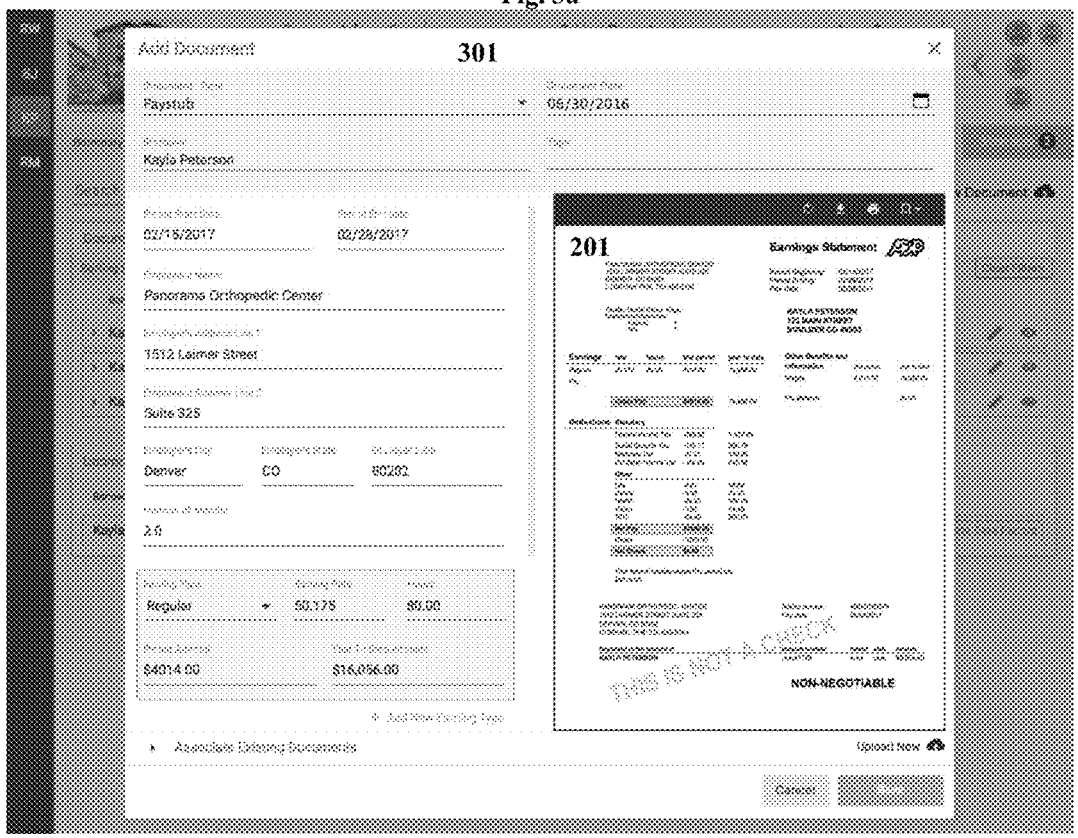
FIG. 3a shows an example of the graphical user interface presented when document is introduced to the system and the text is manually or automatically extracted.

Continuing to refer to FIG. 2, source data (201) is extracted from documents or received directly from a third-party source. In the latter case, there is some level of data quality guarantee that is implicit in the source, and in most cases it can reasonably be moved to the next step of refining. In the case of documents, however, the data quality is dependent on the image quality of the document and the overlying configuration of the OCR engine extracting the data, or on the humans extracting the data in the case of manual entry. FIG. 3a shows an example of a document (301) that is introduced to the system via upload and source data is extracted or manually entered. FIG. 3b shows the corresponding event payload of the document descriptor that is created. FIG. 3c shows the corresponding event payload of the Accepted document descriptor that is created. FIG. 3d shows the corresponding event payload of the Qualifying document descriptor that is created.

Step 2—Accepted Records are Created and Managed

Figure 4:
FIG. 4 shows an example of the graphical user interface when a conflict that requires resolution is presented.
Figure 5A:
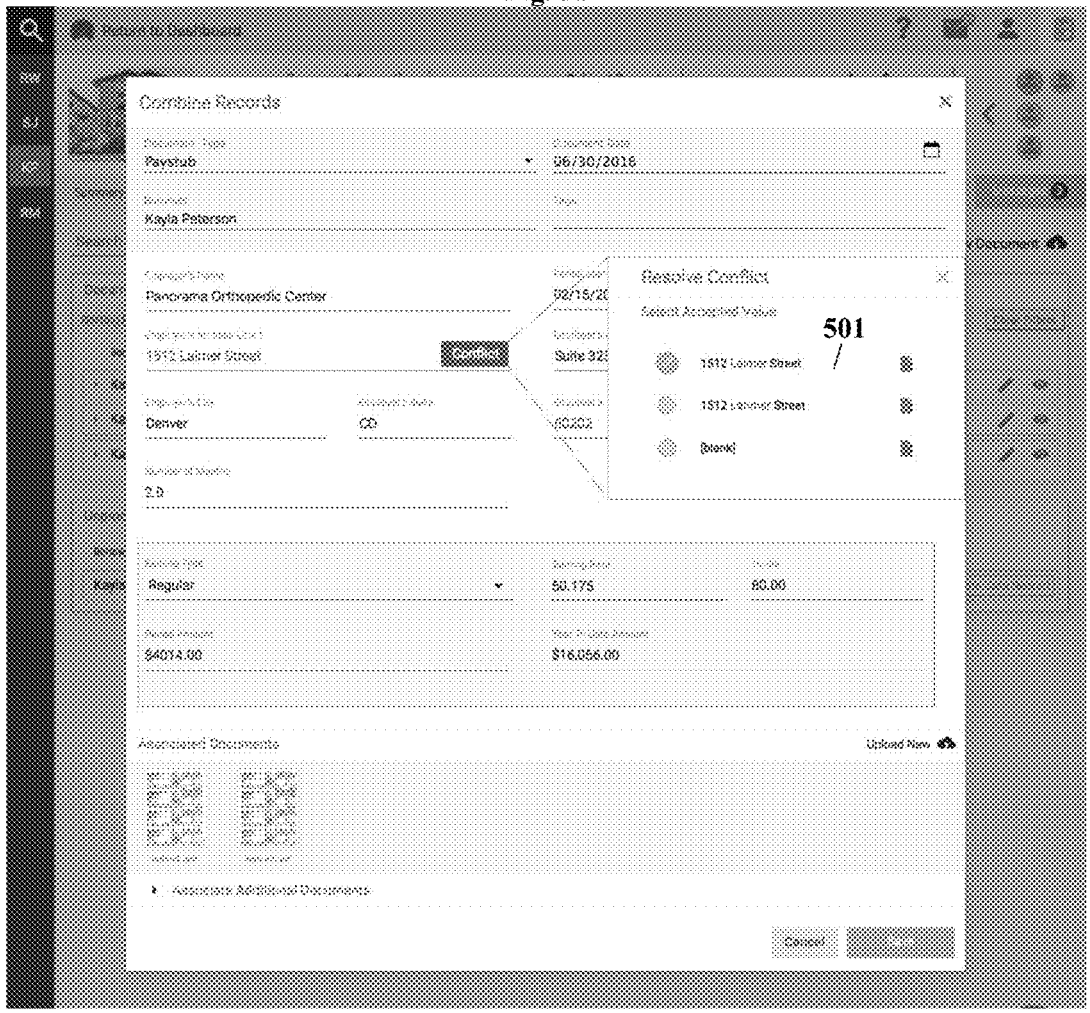
FIG. 5a shows the values available from the source records that will resolve the conflict in and populate the data field.
Figure 6:
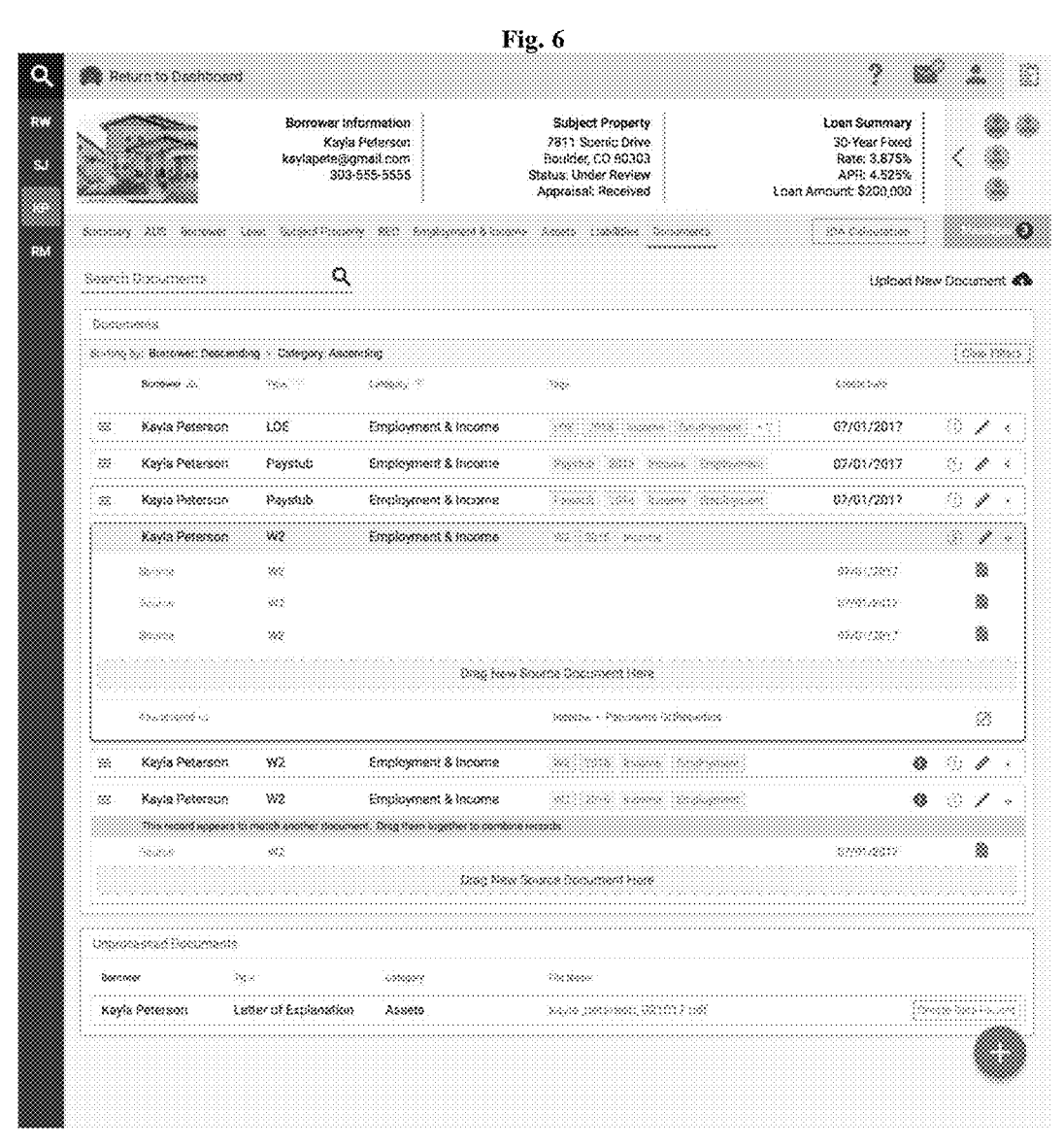

It is possible for multiple copies of the same document to have been introduced to the system. In order for the data set to be used to create a qualifying set of data for the final loan decision, it requires further input. To promote data to an "Accepted" state, the user interface allows the user to select the best values for like documents to create a "golden record" that can be used in downstream calculations. In this step, source records can be combined and the best available data chosen from each source to create an aggregate record, or "accepted record", comprised of the information from each source record. Once two sources are combined, the system compares the values, and keeps any values that exactly match across source records. As seen in FIG. 4, any conflicts (401) are presented to the user to resolve. FIG. 5a shows how to resolve conflicts; the user is presented with all available values for a data field from the source records (501). FIG. 5b shows the corresponding event payload of the document descriptor that is created. The document descriptors list events that are communicated in response to a command. The identification tags point to values used to represent collections of data that may be raw or the result of the data enrichment process. Note that the values are not hard coded numerical. Use of the CQRS architecture allows for the values to point to repositories of raw and enriched data sets. This allows the user to trace back through multiple enrichments to find the original source documents. FIG. 6 exemplifies the user then choosing the best value and that field, which is updated in the accepted record. In this way, the accepted record becomes a perfected, single data set based on all available source data.

Accepted records are applied in various contexts in the loan decision workflow. Those contexts may include liabilities, assets, property, or income qualification. The final product is Perfected Qualifying Data. Source and Accepted statuses apply to document data, while Candidate and Qualifying statuses apply to decision contexts within the loan process. The concepts are the same in general; values are selected to be promoted to the next level. They are related either directly (an accepted record can be replicated in part or whole to be used as a candidate), or they can be related through an additional layer, the support layer.

Step 3—Candidate and Qualifying Process Using Direct Relationships Data

The Candidate and Qualifying processes are designed to allow the user to arrive at a single qualifying record on which to base loan decisions. This qualifying record can be selected from multiple candidates' records, which have been curated specifically for the loan decision context to which they relate. As such, Qualifying records are specific to items required to help an underwriter determine an applicant's eligibility for a loan product, amount, or rate by metrics related to their income, liabilities, assets, and the value and characteristics of the subject property. Each qualifying record could be calculated from a number of industry-standard calculations, or may be sourced from various documents and third-party sources. The goal is to arrive at one representative data set for the loan file. These various data options comprise the candidates for the qualifying record. The goal of the system is to allow the user to review all available candidate data in order to decide which data is best or most appropriate to qualify the applicant or applicants for the loan. By presenting all of the available candidates to qualify as well as the choices made by the user during the selection of the qualifying data set, the decision is tracked to the finest detail so that future reviews can trace the decision and the alternative data that was available at every stage in the decision process.

Candidate values are derived directly from one of more accepted records. A single accepted record may be used to support candidates in more than one context, and will be the more complete data set. When an accepted record is used as a candidate (or to support a candidate), the candidate may use only a subset of the data that was available in the original accepted record. For example, an applicant's personal bank statement may be used to verify a liability payment for her alimony payments to her ex-husband, and it also may be used to support her bank account as an asset. The accepted record will include some identifying information about the account (e.g., financial institution, account number), a statement date and account balance, and line items detailing important transactions. In the case of liability, the transactions related to alimony payments will be used to support a liability candidate, while the account balance will be used to support the bank account asset.

Figure 7A:
FIG. 7a shows an example of the graphical user interface presented when the user has two liabilities that were entered by the applicant in the Borrower Wallet.

In FIG. 7a, the sample user has two liabilities (701, 702) that were entered by the applicant in the Borrower Wallet. In the case of reported data, it is directly entered as a candidate that is selected to qualify because it is the only candidate available at this stage. FIG. 7b shows the corresponding event payload of the applicant reported Candidate record that is created. FIG. 7c shows the corresponding event payload of the applicant reported Qualifying record that is created.

FIG. 8a shows the data input from a user run, common credit report which returns new liability records (801, 802). These may represent unreported liabilities, or may correspond to existing liabilities that were reported by the borrower. Because their disposition is unknown at the moment, they are routed to an "unallocated" queue awaiting association. At this point the records behave like accepted records. Although they are not from documents, they come from a trusted third-party source (in this case, integration with a vendor that provides direct credit reporting data) and can be assumed to be of high integrity. FIG. 8b shows the corresponding event payload created.

Figure 9:
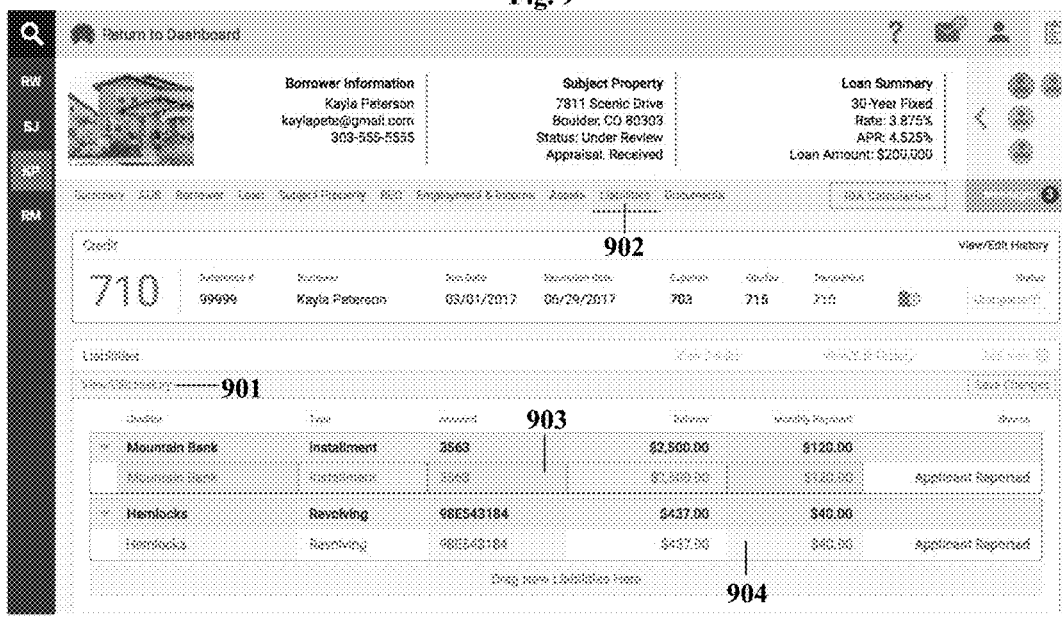
FIG. 9 shows the result of the user selecting the "history" view of liabilities, which shows the liability that has been selected to qualify (the top line in bold/grey) and the candidate(s) that contribute to that qualifying record.
Figure 10A:
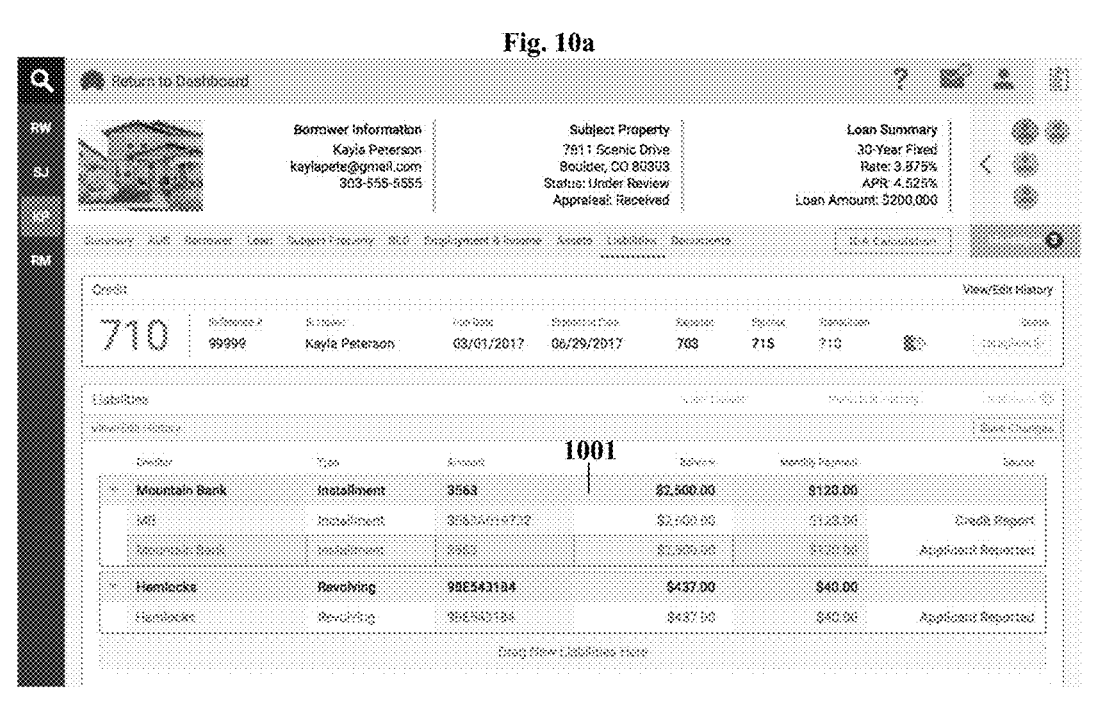

FIG. 9 displays the result of the user selecting the "history" view (901) of liabilities (902), which shows the liability (903, 904) that has been selected to qualify (the top line in bold/grey) and the candidate(s) that contribute to that qualifying record. Since the new unallocated records have not yet been indexed, the only candidate is the record as it was reported by the applicant and it is, by default, selected to qualify. In FIG. 10a, the user has moved one of the unallocated liabilities to be an alternative candidate for an existing liability (1001). No values have been changed on the qualifying record, but with more candidates available, there are more options for each value. FIG. 10b shows the corresponding event payload of indexing Candidate liability created. FIG. 10c shows the corresponding event payload from creating a new Candidate from allocated liability data.

Figure 11A:
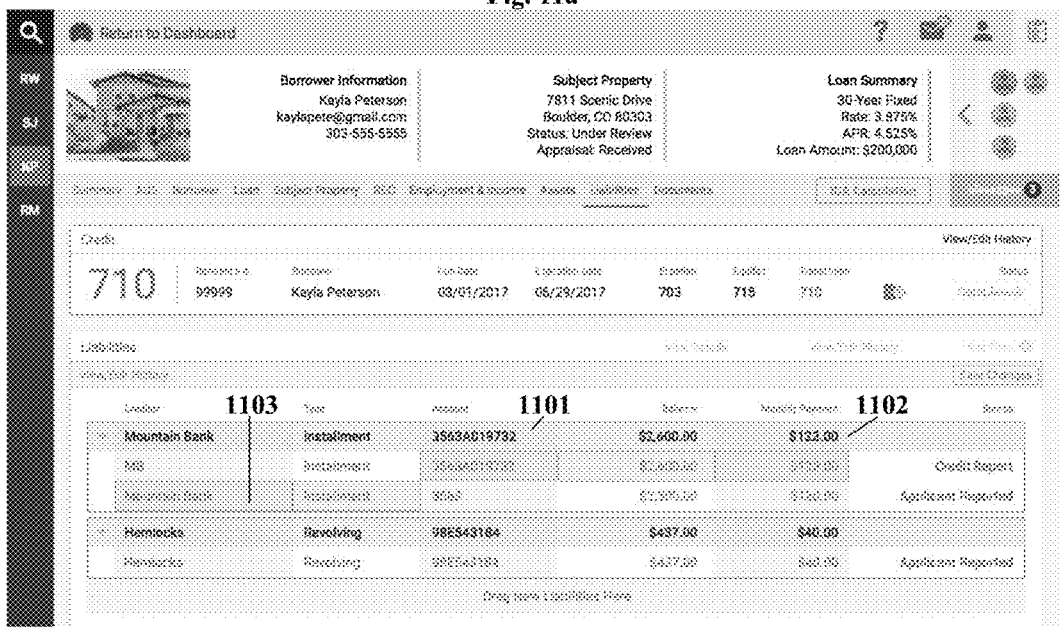
FIG. 11a shows an example of the user having updated the selections for the qualifying record to reflect the new data.
Figure 12:
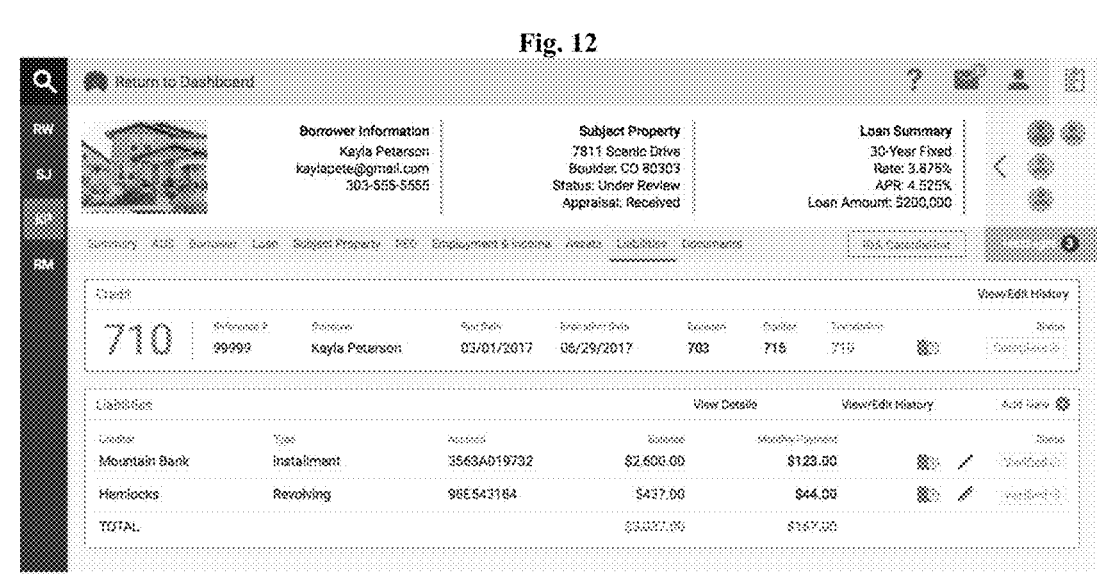

In FIG. 11a, the user has updated the selections for the qualifying record to reflect the new data. The user determines that the credit report data returned a more complete account number (1101) and a more up-to-date balance and monthly payment (1102), but the creditor name reported by the borrower is not abbreviated (1103) and thus is better data. FIG. 11b shows the corresponding event payload created during the Qualified record update. In FIG. 12, the history view has been collapsed to the summary view and only the newly updated qualifying record shows.

Step 4—Candidate and Qualifying Process Using Support Relationships Data

When determining qualifying income, there is an additional layer of complexity. Unlike some of the scenarios presented in step 3, where a single accepted record becomes a single candidate, here, one candidate may be supported by some derivation of more than one accepted record. Income can be reported in various ways, and must be converted to a monthly amount in order to be qualified against the expenses related to the proposed mortgage loan and the applicant's monthly liability payments. This monthly conversion can be calculated in a number of ways to get to a final qualifying amount. These calculation options depend in part on the income type as well as other characteristics of the applicant or loan file and investor guidelines. Within each income type and scenario, there are several calculation options. For example, employment base pay can be calculated as the current base pay reported on the paystub multiplied by the frequency of the pay in order to arrive at a monthly amount. Alternatively, the year-to-date amount can be extracted from the paystub and divided by the number of months since the beginning of the year to account for fluctuations in pay over time. To extend this theme further, a one-year or two-year average can be calculated from W2, FNMA Form 1005, or tax forms. In each case, the results may be slightly different (accounting for slight or major fluctuations in income over time), and the most appropriate or conservative choice may depend on the specific details of the applicant's data.

Figure 13:
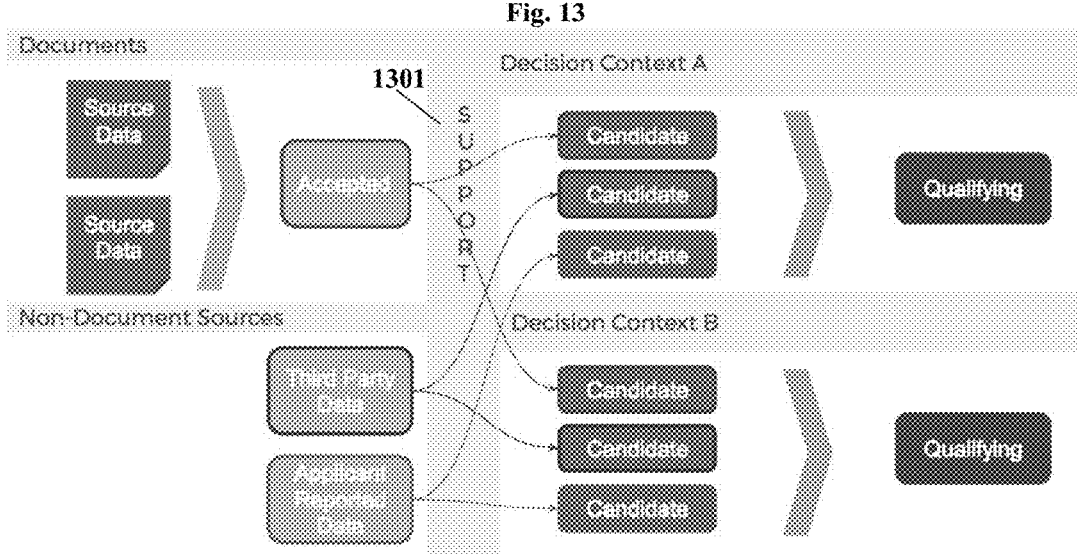
FIG. 13 shows the process of obtaining qualifying records to be used in the loan decision process wherein some data is refined or reformatted through a support layer.

As such, Candidates for qualifying income are calculated values that may be derived from one or multiple accepted records. This requires an additional layer of relationship between accepted records in order to derive a Candidate. FIG. 13 displays this support layer (1301) that allows the system to manipulate and recombine data from Accepted records and specify parts or derivatives of them to be input into a calculator to create Candidates. The qualifying process then continues by selecting from the available candidate calculations.

Figure 14:
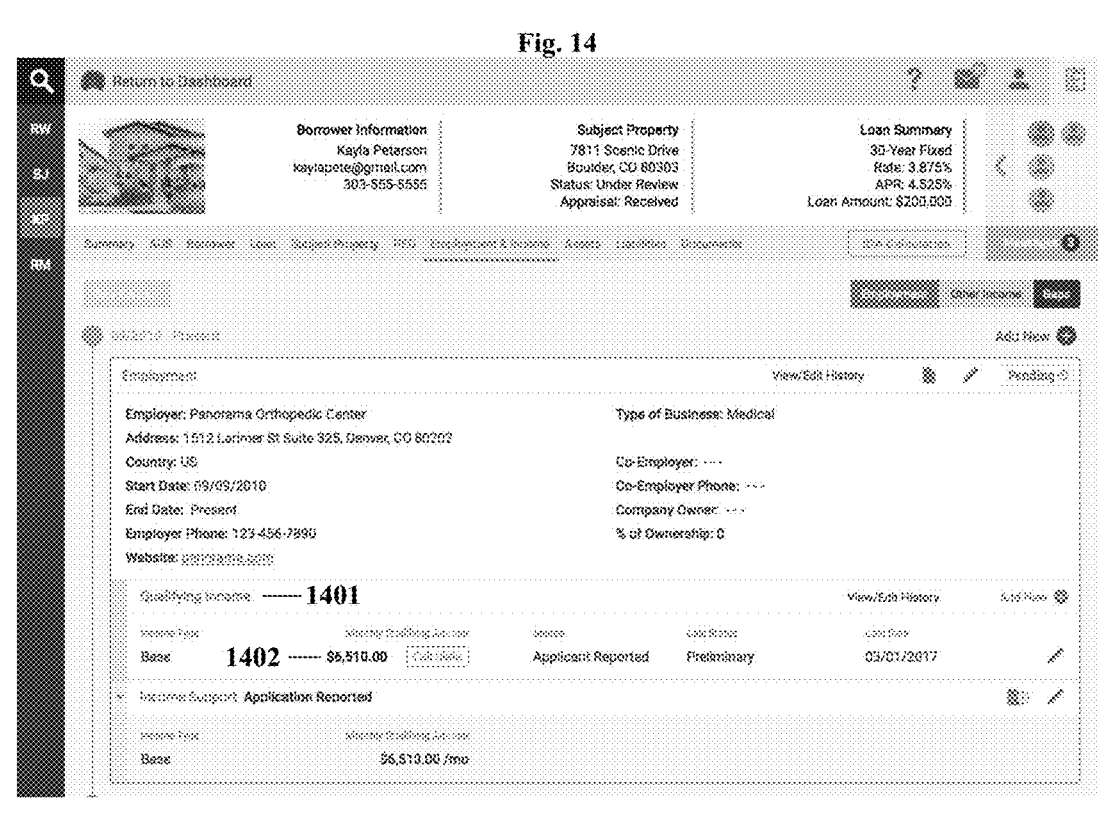

Employment and preliminary income data is first entered into the system via integration with the borrower-facing platform, the Borrower Wallet, or manually by a factory user. FIG. 14 exemplifies the preliminary qualifying income (1401) that is calculated based on the data reported by the applicant (1402).

Figure 15:
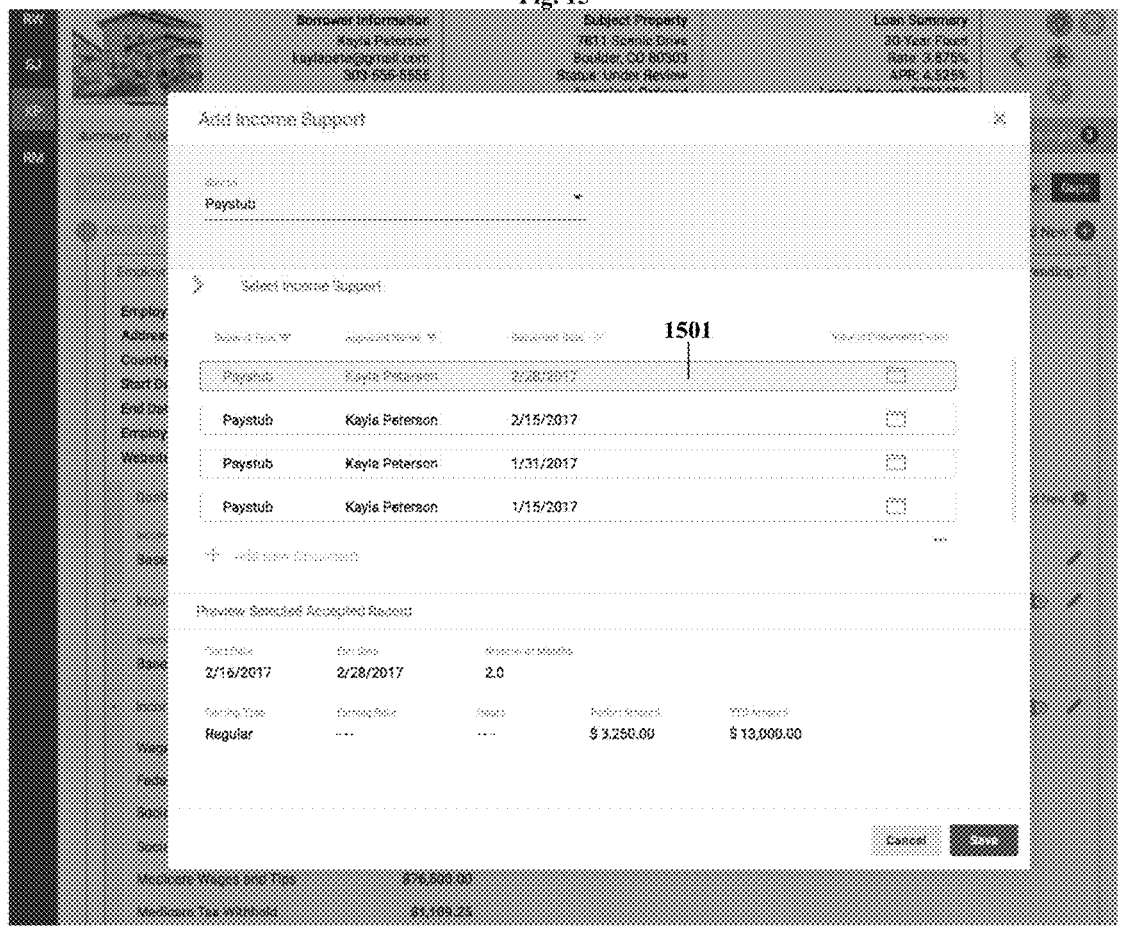
FIG. 15 shows an example of the graphical user interface presented when the user has selected the option to add a new W2 income support record, and is allowed to select from a list of W2s related to the selected applicant.
Figure 16:
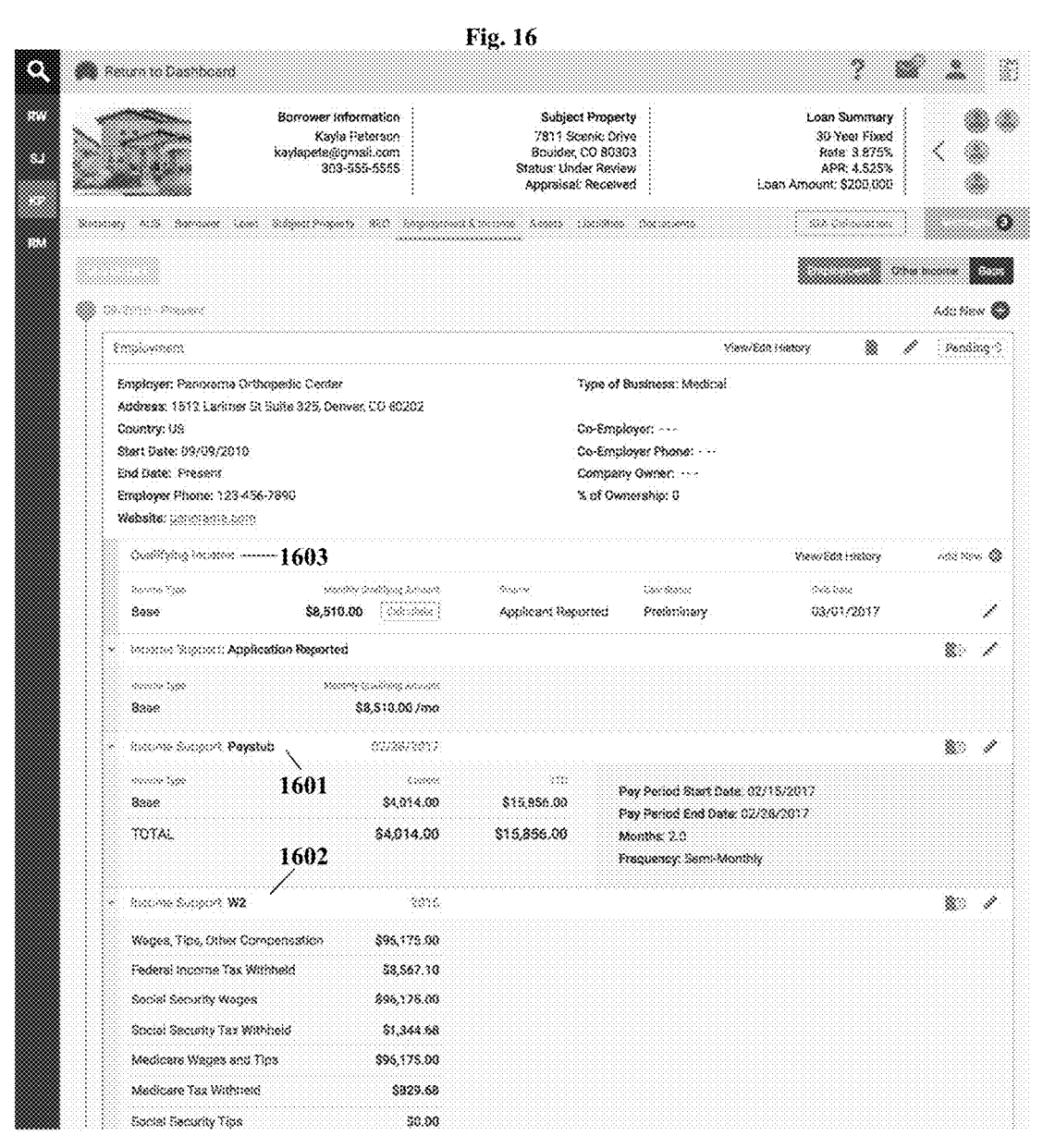

In order to elevate the status of the income to a decision status, more information must be added. For an employment income, this requires documentation such as paystub data, W2, FNMA Form 1005, or in some scenarios, tax returns. This step should leverage accepted document data that was already introduced to the system in the source and accepted steps. In FIG. 15, the user has selected the option to add a new paystub income support record (1501), and is allowed to select from a list of paystubs related to the selected applicant. The user selects the intended paystub and associates it to the income record. In FIG. 16, the user has associated paystub (1601) and W2 data (1602) to support the income being evaluated. The system can now perform calculations based on the new data to obtain more accurate supported monthly income data.

Figure 17:
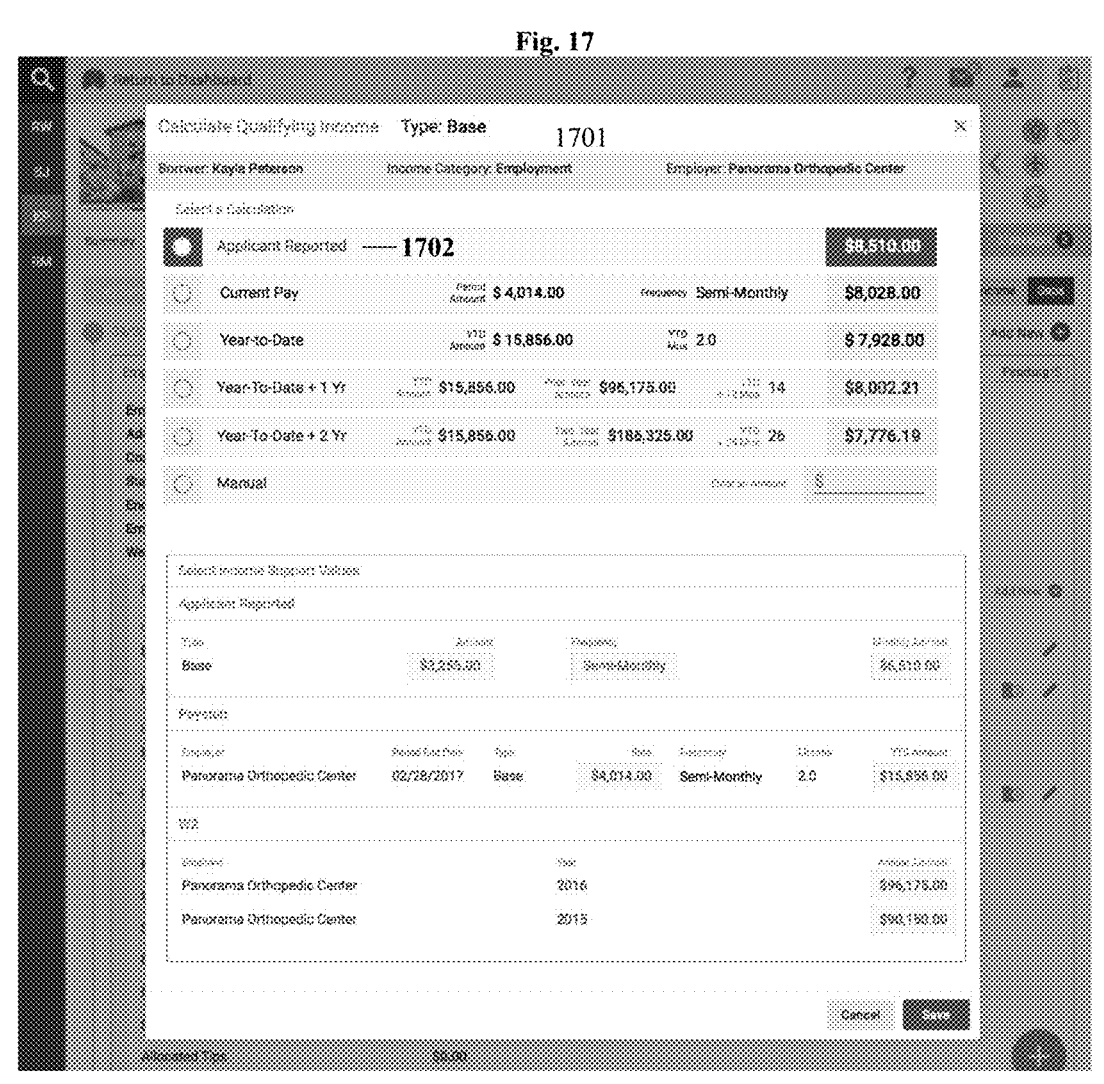
Figure 18:
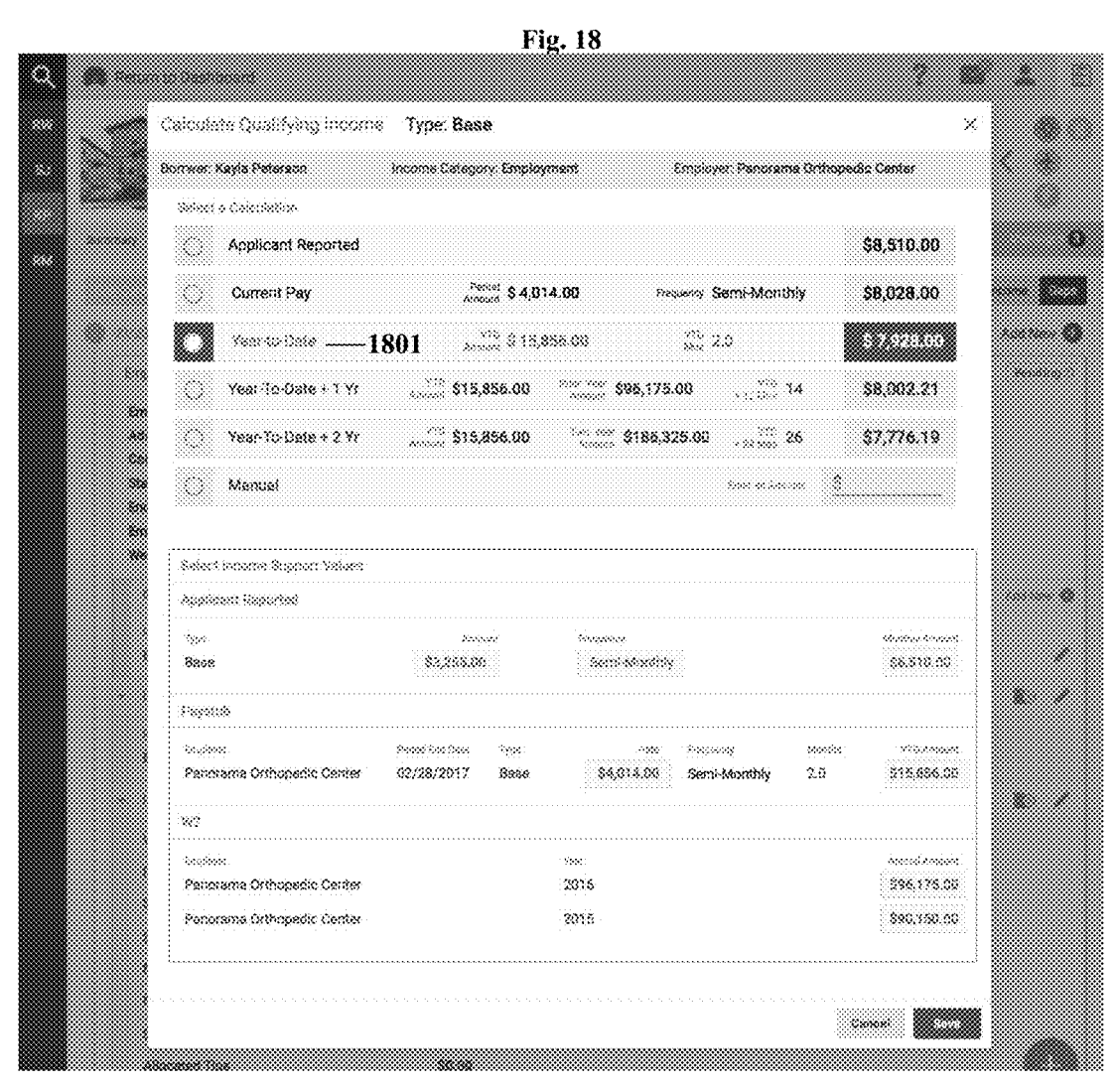
Figure 19:
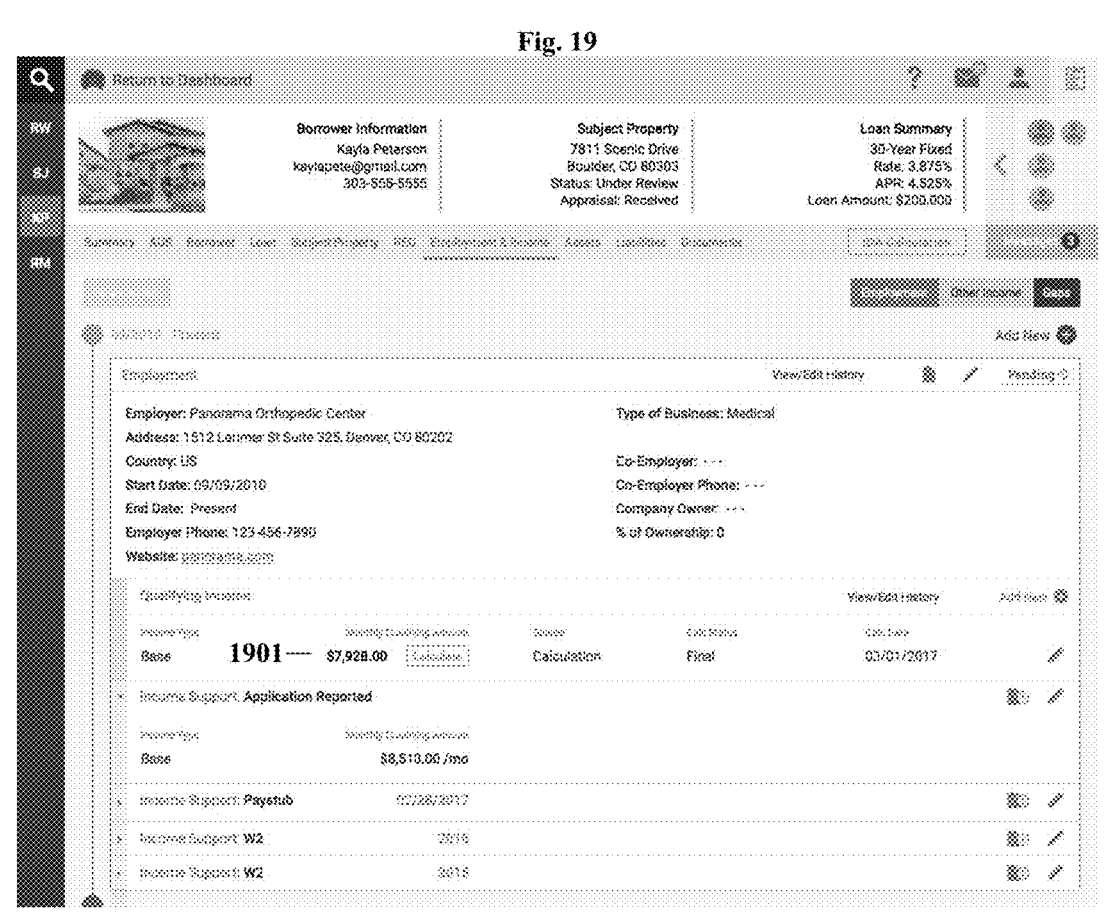

In FIG. 17, the user has selected the "Calculate" button (1603) in FIG. 16 next to the income to open a calculator modal (1701). In this modal, the user selects the income support records that should be used in the calculations and the system performs a series of calculations based on industry-standard rules and presents the results of the calculations to the user. These calculations are the candidates for qualifying income. The default is set to the applicant reported record (1702), but the user may select the calculation that best represents the data. In FIG. 18, the user has updated the qualifying selection to an alternative candidate (1801). FIG. 19 shows the updated Employment and Income page, wherein the qualifying income calculation has been updated (1901) to reflect the new candidate selection.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® Homesync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U°, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of source data records (and associated identifiers), accepted data records (and associated identifiers), candidate data records (and associated identifiers), qualifying data records (and associated identifiers), and event logging information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1—Income Data Record Enrichment for a Mortgage Application

An applicant uploads her 2015 W2 from her job three times. After OCR, each document has a slightly different set of data extracted:

TABLE 1

Income Source Data

| | W2 #1 | W2 #2 | W2 #3 |
|---|---|---|---|
| Employee Name | Kayla Peterson | Kayla Peterson | (value not read) |
| Employer Name | PromonTech, LLC | Promontec | (value not read) |
| Employer Id # | 01113498 | OIII34980 | 011134980 |
| Wages, Tips, and Other Compensation | (value not read) | $65,000 | $6500000 |

Since they are three versions of the same document, a single common data set is needed in order to use the document data for income calculations or for other data verification. In this example, that "best known" single data set must come from parts of each document data set, since each set is incomplete or low quality on its own:

TABLE 2

Accepted Data

| | W2 #1 | W2 #2 | W2 #3 |
|---|---|---|---|
| Employee Name | Kayla Peterson | Kayla Peterson | (value not read) |
| Employer Name | PromonTech LLC | Promontec | (value not read) |
| Employer Id # | 01113498 | OIII34980 | 011134980 |
| Wages, Tips, and Other Compensation | (value not read) | $65,000 | $6500000 |

Here, the first document has an incomplete Employer Id # and the OCR engine has not read a value for the income. The second document has a bad OCR read on the Employer Name and Employer Id # (it returns the letter "O" in place of the numeral "0" and the letter "I" in place of the number "1"). The third document is of generally low quality and returns an incomplete data set on most fields (including a missing comma in the income field), but has a more complete value in the Employer Id # field. To make a complete 2015 W2 record for this employer, differentiating pieces of data from each source document is required.

TABLE 3

Final Accepted Record

| | |
|---|---|
| Employee Name | Kayla Peterson |
| Employer Name | PromonTech, LLC |
| Employer Id # | 011134980 |
| Wages, Tips, and Other Compensation | $65,000 |

Note: Some of the decisions about which data elements are selected to promote to the next level can be automated. By writing reasonable limits and rules for selected values the system can be configured to select the best values with a reasonable degree of confidence, eliminating some of the manual process required to make decisions about the final data set output from this and future steps.

This Accepted-level document data can then be used in a number of contexts to verify loan and applicant data, or to create a qualifying set of data for income, debt, asset, property, and other loan-level qualifying calculations. The Accepted document data set can apply to one or multiple verification or calculation contexts within the loan. For example, the W2 data above could be used to verify applicant identity, to verify employment information, and to calculate qualifying income and the Debt-to-Income (DTI) ratio.

The Accepted data set can be used for verification on its own, or it can be further refined to be specific to the Qualifying calculations for loan. The next step in the process, then, is to create a context-based set of records that will be presented as candidates for a final qualifying amount. The user can be presented with all of the possible options for a given qualifying record, and choose the elements. The novelty of this approach is that all of the data for the options that were presented are preserved and the choice and the reason for the choice are recorded. Future reviews (prior to or after closing) will allow another individual to update the choices made in earlier parts of the loan process, or to reproduce the decision using the exact and complete data available to the original decisioner.

In some scenarios (e.g., liabilities and assets) the Accepted data translate directly into Candidates. In this example, the processor or underwriter is presented with a single liability and needs to create the qualifying liability record that will be used in the debt calculations for the loan. The system contains several versions of the same liability record from multiple sources: one was reported by the applicant, and two were received as the result of the processor running the applicant's credit twice. Since the data came directly from a trusted source and not from a document (in this case, a credit reporting vendor), it begins as an Accepted record and directly becomes a Candidate to qualify.

TABLE 4

Candidate Records

|  | Reported | Credit Report 1 | Credit Report 2 |
| --- | --- | --- | --- |
| Applicant Name | Kayla Peterson | Kayla M. Peterson | Kayla M. Peterson |
| Creditor | Wells | Wells Fargo | Wells Fargo |
| Unpaid Balance | $20,000.00 | $21,456.89 | $19,400.89 |
| Monthly Payment | $2,000.00 | $2,056.00 | $2,055.00 |

Presented with this information, the processor or underwriter can compare data and make a decision as to which parts of the candidate records should be used to qualify the loan. Without this relationship between the data, there is a risk that the same liability values will be counted multiple times in the final calculation.

TABLE 5

Qualifying Record

|  | Reported | Credit Report 1 | Credit Report 2 |
| --- | --- | --- | --- |
| Applicant Name | Kayla Peterson | Kayla M. Peterson | Kayla M. Peterson |
| Creditor | Wells | Wells Fargo | Wells Fargo |
| Unpaid Balance | $20,000.00 | $21,456.89 | $19,400.89 |
| Monthly Payment | $2,000.00 | $2,056.00 | $2,055.00 |

This step is critical to the eventual automation of decisions or parts of decisions. Some of the manual process can be eliminated, or at least streamlined, by writing smart logic that tells the system to assume, for example, that the most recent credit report is the "best known data". In other words, if there is better data available (document or credit report data), then never use applicant reported data in a qualifying record.

Now the qualifying record is a single, data-perfected unit with all of the supporting and candidate data and decisions that lead to the creation of the record preserved, auditable, referenceable and reproducible within the system.

TABLE 6

Final Qualifying Record

| Applicant Name | Kayla Peterson |
| --- | --- |
| Creditor | Wells Fargo |
| Unpaid Balance | $19,400.89 |
| Monthly Payment | $2,055.00 |

This model is applicable across components of the loan file and is also applicable to higher-level calculations.

For example, consider that calculating Kayla's monthly income from a number of Accepted records:

TABLE 7

Diverse Accepted Income Data Records

| Source: 2016 W2 | Source: Paystub Mar. 1, 2017 | Source: Paystub Mar. 15, 2017 |
| --- | --- | --- |
| Wages, Tips, and Other Compensation $65,000.00 | Gross Pay: $2,708.00 Year-To-Date: $13,740.00 Frequency: Semi-Monthly # Months worked this year: 2.0 | Gross Pay: $2,808.00 Year-To-Date: $16,548.00 Frequency: Semi-Monthly # Months worked this year: 2.5 |

Note: The data and calculations in this example have been simplified for illustration purposes.

Here, no single Accepted record is a candidate for the monthly income calculation that will be used in the loan-level income decision. Rather, the calculation must be derived from data points on one or several of the documents.

Income can be calculated using various methodologies. Industry-standard calculations are preformed and presented to the user for selection. In this way, the calculation options become the candidates, and the selected calculation becomes the qualifying amount:

TABLE 8

Calculation Candidates for Base Income for an Applicant

| Current Income (Paystub amount for the most recent paystub × 2) | $5,616.00 ($2,808.00 × 2) from the most recent Paystub |
| --- | --- |
| Year-To-Date Average (Paystub year-to-date amount/Number of months worked in the current year) | $6,619.20 ($16,548.00/2.5) from the most recent Paystub |
| Year-To-Date + 1 Year Average ((Paystub year-to-date amount + Last year's W2 amount)/(Number of months worked in the current year + 12)) | $5,624.00 ($16,548.00 + $65,000.00)/(12 + 2.5) from the most recent Paystub and the W2 |

Each calculation methodology yields a slightly different result. The calculations are presented to the user as candidates and he or she is allowed to select the one with which to qualify the applicant.

TABLE 9

Qualifying Base Income for an Applicant

| Current Income (Paystub amount for the most recent paystub × 2) | $5,616.00 ($2,808.00 × 2) from the most recent Paystub |
| --- | --- |
| Year-To-Date Average (Paystub year-to-date amount/Number of months worked in the current year) | $6,619.20 ($16,548.00/2.5) from the most recent Paystub |
| Year-To-Date + 1 Year Average ((Paystub year-to-date amount + Last year's W2 amount)/(Number of months worked in the current year + 12)) | $5,624.00 ($16,548.00 + $65,000.00)/(12 + 2.5) from the most recent Paystub and the W2 |

In this case, the user selects an average that factors in accepted data from multiple sources. The decision is tracked, and the alternative options available to the user are recorded as unselected candidates.

Example 2—Tracing the Data Through the Process

Figure 20:
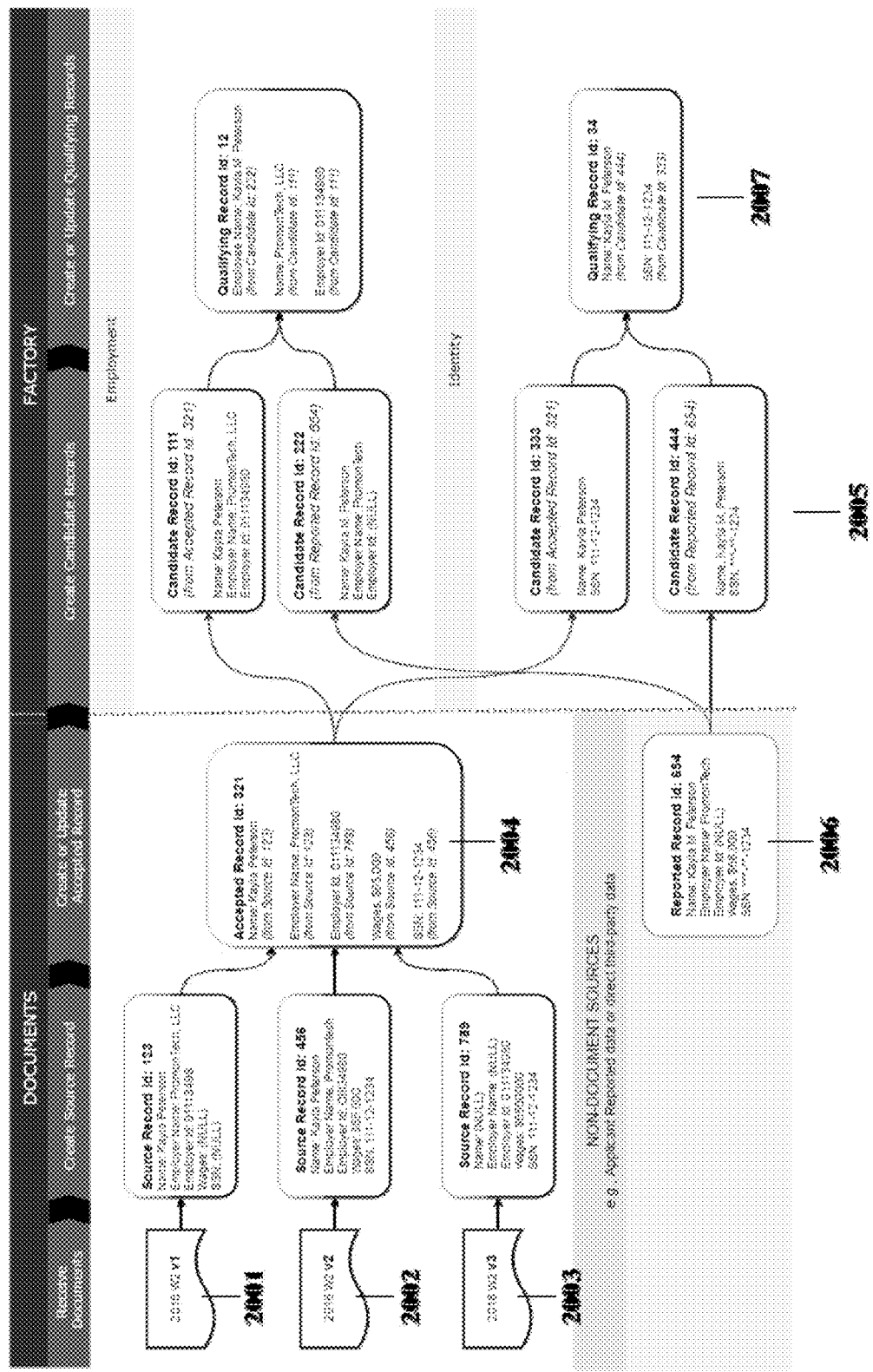
FIG. 20 shows a non-limiting exemplary application architecture; in this case, an application architecture designed to capture all events such that the current state can be reproduced at any point in time by replaying events related to an entity with zero data loss.

In FIG. 20, the data is traced from source through qualifying. For this purpose, a simplified example of qualifying contexts is used. Here, the W2 source document is used to qualify the employment data and the identity of the borrower.

Continuing to refer to FIG. 20, three W2 documents are introduced into the system. Each one has gone through OCR. The first W2 (2001) does not return a value for the wage or SSN. The second W2 (2002) has a good read on wages and SSN, but the employee ID number comes back with 0/O and I/1 transposed. The third W2 (2003) is missing name and employer name, but has the most complete employer ID of the set. The user selects the best data from each version of the documents to create a single, aggregated accepted record (2004). This accepted record is then applied in multiple contexts as candidates to qualify the information (2005). The accepted record is used to create candidates for employment verification and identity verification. Alternative candidates are derived from the applicant reported data (2006). The user selects the best values from the available candidates in order to create the final qualifying record (2007) for the loan file.

Figure 21:
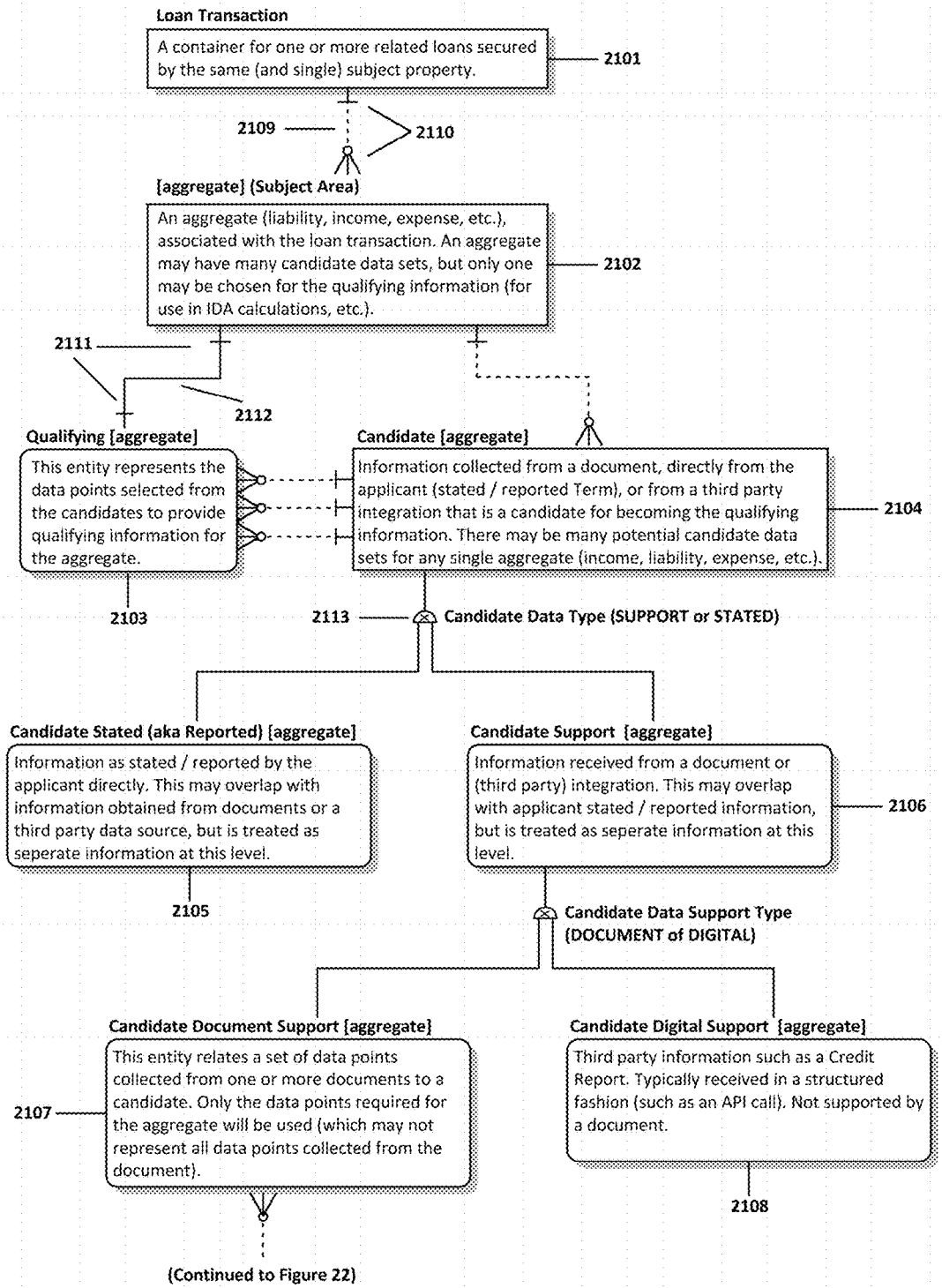
FIG. 21 shows a non-limiting example of an aggregate-specific metadata relational model; in this case, a data model illustrating the relationship between aggregates.

FIG. 21 depicts an exemplary aggregate-specific metadata relational model. The loan transaction (2101) represents one or more related loans secured by the same (and single) subject property. The subject area aggregate (2102) represents an aggregate (liability, income, expenses, etc.), associated with the loan transaction. An aggregate may have many candidate data sets, and one may be actively chosen each time for the qualifying information (for use in IDA calculations, etc.). The qualifying aggregate (2103) represents the data points selected from the candidate to provide qualifying information for the aggregate. The candidate aggregate (2104) represents information collected from a document, directly from the applicant (stated/reported term), or from a third party integration that is a candidate for becoming the qualifying information. There may be many potential candidate data sets for any single aggregate (income, liability, expenses, etc.). The candidate stated aggregate (2105) represents information as stated or reported by the applicant directly. This may overlap with information obtained from documents or a third party data source, but is treated as separate information at this level. The candidate support aggregate (2106) represents information received from a document or third party integration. This may overlap with the applicants stated or reported information, but is treated as separate information at this level. The candidate document support aggregate (2107) represents a set of data points collected from one or more documents to a candidate. Only the data points required for the aggregate will be used (which may not represent all data points collected from the document). The lines connecting the model provide context for relationship between representations. Dashed lines (2109) indicate a "non-identifying relationship": the primary key from the parent entity does not become part of the primary key for the child entity. The primary key from the parent entity is a foreign key in the child entity. Solid lines (2112) indicate an "identifying relationship": the primary key from the parent entity becomes part of the primary key for the child entity (as well as being a foreign key). Cardinality symbols 2110 represent a one to zero, one or many relationship, which is mandatory. The primary key from the parent entity is a foreign key in the child entity. All records in the child entity must have a valid parent entity value (the foreign key in the child entity may not be null). The child entity may contain no records that correspond to the parent entity, or it may contain one or more. Cardinality symbols 2111 represent a one to one relationship, which is mandatory. All records in the child entity must have a valid parent entity value (the foreign key in the child entity may not be null). The child entity may contain one and only one record that corresponds to the parent entity. Semicircle x symbol 2113 represents a subtype cluster relationship and are always identifying. In a subtype cluster, the primary key is also the primary key in all child entities. The cardinality between entities in a subtype cluster is always one to one.

Figure 22:
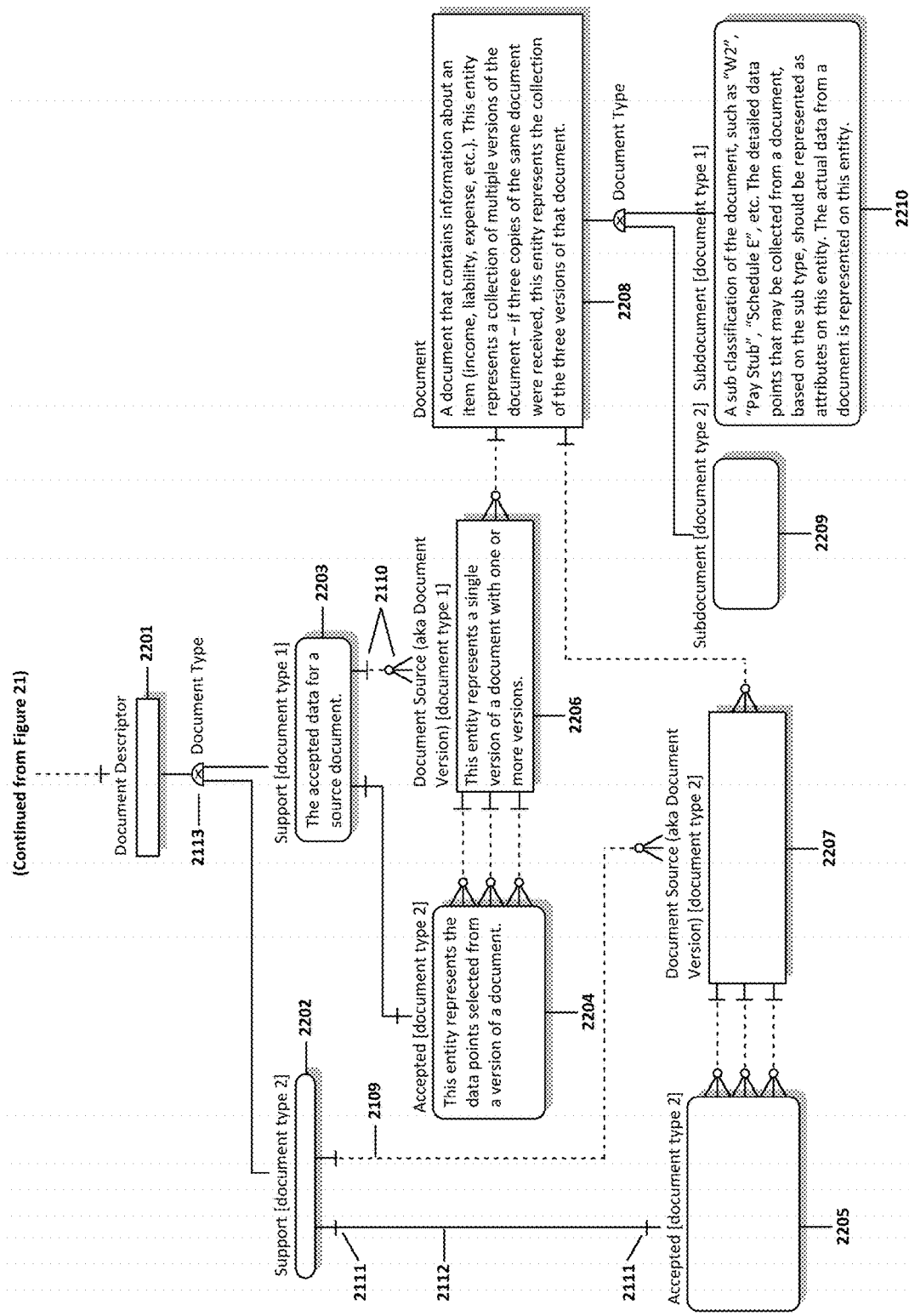
FIG. 22 shows a non-limiting example of a document-specific metadata relational model; in this case, a data model illustrating the relationship between documents.

FIG. 22 depicts an exemplary document-specific metadata relational model. The document descriptor (2201) represents the top level entity for document released data. The document descriptor represents the collection of all data associated with a document and serves as the link between document data and Candidate/Qualifying data for a given subject area. Support documents (2202 and 2203) represent the collection of all attributes that comprise the accepted data set. Accepted documents (2204 and 2205) represent the individual attributes selected from multiple copies (or a single copy) of a document to form the Accepted data set. Document source (2206 and 2207) represent a single version of a document with one or more versions. For, example, if an applicant submits three copies of a "W2", this entity contains a record of each copy. Document (2208) represents a document that contains information needed for the loan. The document will relate to an applicant's income, liabilities, assets, etc. This represents multiple versions of the same type of document. For example, if an Applicant submitted three copies of a paystub, this entity would contain a single record that connects the three versions of the same document. As the parent of the Subdocument cluster, this contains attributes that are common across all documents. The subdocument (2209, 2210) represents a sub classification of the document, such as "W2," "paystub," "Schedule E," etc. The detailed data points that are collected from a document, based on the sub type cluster discriminator (Document Type), are represented as attributes.

Figure 23:
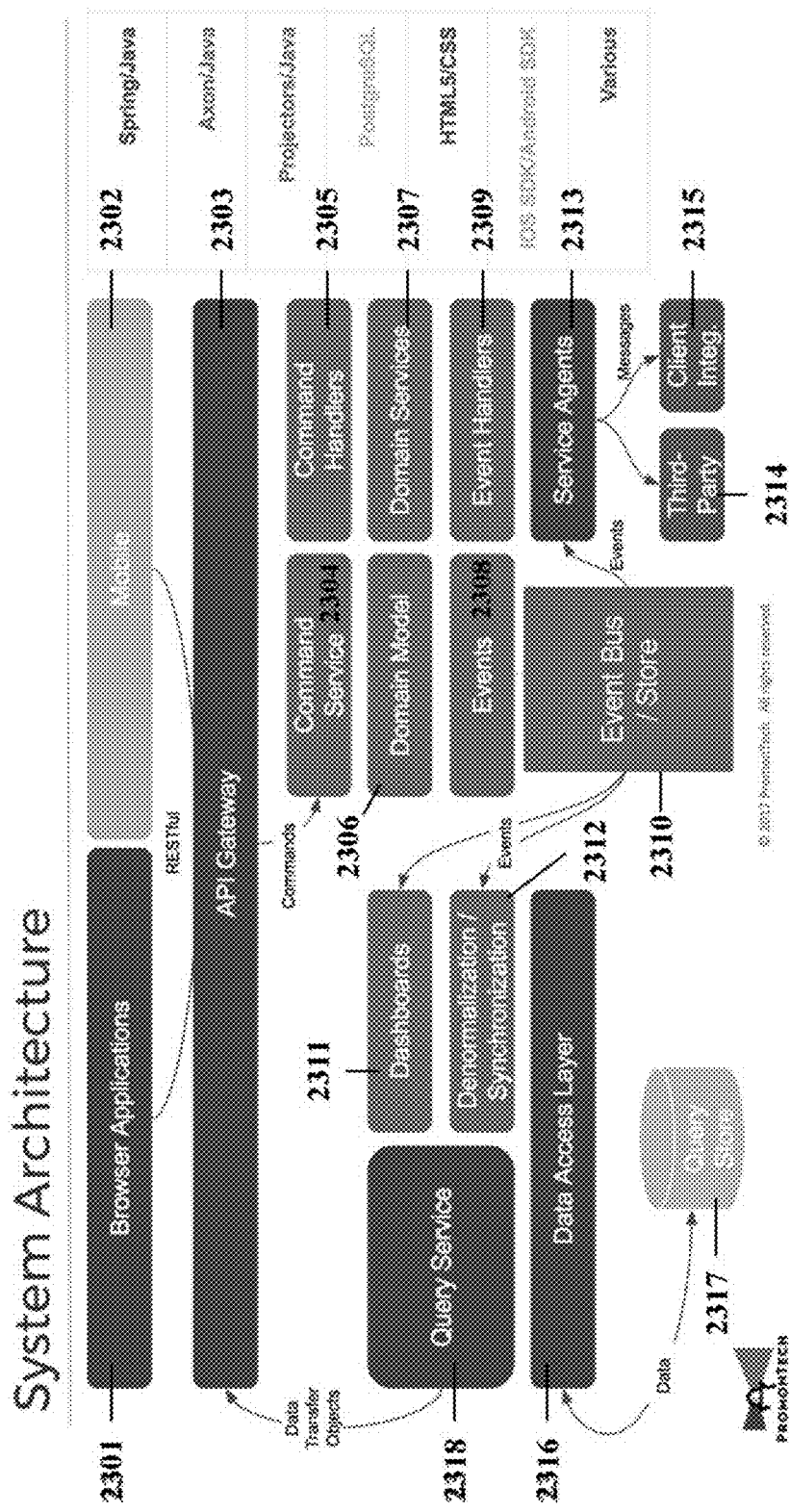
FIG. 23 shows a non-limiting exemplary schematic flow diagram for a data record enrichment process; in this case, a schematic flow diagram illustrating a data record enrichment process for a plurality of income data records for an individual.

In FIG. 23, a suitable system architecture embodying the CQRS design pattern is depicted. In this embodiment, the system architecture employs separate query and command objects to retrieve and modify data, respectively, to ensure permanent documentation of all relevant data enrichment events, which enables full auditability and re-creation of the entire enrichment methodology at any point in time. The exemplary architecture depicted in FIG. 23 was developed for the purpose of creating and preserving an event log comprising all data used in a data enrichment process, including the source of each datum. The architecture, at a high level, is separated into components for handling events, such as the command, domain, and event components (generally depicted on the right of the diagram) and components for handling queries (generally depicted on the left of the diagram). This exemplary architecture allows for each event to be securely logged such that a user can recall any event upon request. Aggregates of logged events are used to improve operating efficiency. By preserving events as immutable facts, which are logged separately, no process within the architecture can overwrite or change the event log.

Continuing to refer to FIG. 23, client applications, such as browser applications (2301) and mobile applications (2302) present a user interface to borrowers. The client applications communicate with the back-end of the application via a RESTful API Gateway (2303). In this embodiment, the API Gateway (2303) routes messages and passes commands to the command service (2304) for further internal routing. The domain model (2306) is, for example, a representation of an applicant loan. All past occurrences are treated as events (2308), or immutable facts, by the application and logged in the event bus/store (2310), which publishes or broadcasts events to other parts of the application. By way of example, events are broadcast to services agents (2313) for use in messages to third parties (2314) and for client integration (2315). By way of further example, events are broadcast to dashboards (2311) and to a denormalization/synchronization service (2312) to make the events consumable by users. A data access layer (2316) communicates with a query store (2317) to provide a query service (2318) available to generate data objects for transfer to the client applications via the API Gateway (2303).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented method of enriching the quality of a loan origination data set for an applicant comprising a plurality of data records by selectively removing data records to compact the data set while preserving data provenance comprising the data records, the source of the data records, and each reductive selection of the enriching process to enable reversal and recommission of the enriching process, the method comprising:
    a) maintaining an immutable ledger recording a current state of the data set, the current state comprising a log of each state having existed in the enriching process, the ledger allowing the process to be replicated under alternative data record selection criteria without loss of selection options;
    b) receiving a plurality of source data records pertaining to income, assets, liabilities, or credit worthiness for the loan applicant, each source data record comprising multiple data fields, each source data record comprising data fields at least partially overlapping with the data fields of at least one other source data record, each source data record comprising a unique source data record identifier;
    c) reductively selecting a plurality of data fields from among the plurality of source data records to enrich the quality of the data set, compact the data set, and compile one or more accepted data records, each selected data field in an accepted data record comprising the best known data from among the plurality of source data records and retaining an association with a relevant source data record identifier and a reason for its selection, each accepted data record comprising a unique accepted data record identifier, and recording, to the immutable ledger, the current state of the data set comprising each selected data field in each accepted data record, the relevant source data record identifier, and the reason for its selection;
    d) reductively selecting a plurality of data fields from among the one or more accepted data records to further enrich the quality of the data set, further compact the data set, and create one or more candidate data records, each selected data field in a candidate data record retaining an association with a relevant accepted data record identifier and a reason for its selection, each candidate data record comprising a unique candidate data record identifier, and recording, to the immutable ledger, the current state of the data set comprising each selected data field in each candidate data record, the relevant accepted data record identifier, and the reason for its selection;
    e) reductively selecting a plurality of data fields from among the one or more candidate data records to further enrich the quality of the data set, further compact the data set, and create one or more qualifying data records, each selected data field in a qualifying data record retaining an association with a relevant candidate data record identifier and a reason for its selection, and recording, to the immutable ledger, the current state of the data set comprising each selected data field in each qualifying data record, the relevant candidate data record identifier, and the reason for its selection; and
    f) utilizing the state data of the immutable ledger to reverse each selective reduction of the enrichment process to obtain the plurality of source data records and recommissioning each selective reduction of the enrichment process under alternative data record selection criteria.

2. The method of claim 1, wherein at least one source data record comprises direct credit reporting data from a third-party vendor.

3. The method of claim 1, wherein at least one source data record comprises data extracted from an optical character recognition engine.

4. The method of claim 1 further comprising identifying conflict at a partially overlapping data field and presenting all available values for the partially overlapping data field.

5. The method of claim 1, wherein the source data records pertain to a property.

6. The method of claim 1, wherein the selecting of a plurality of data fields from among the plurality of source data records to create one or more accepted data records is performed by a human.

7. The method of claim 1, wherein the selecting of a plurality of data fields from among the plurality of source data records to compile one or more accepted data records is performed by application of a set of pre-configured rules.

8. The method of claim 1, wherein the selecting of a plurality of data fields from among the plurality of source data records to compile one or more accepted data records is performed by application of a machine learning algorithm.

9. The method of claim 1, wherein the creation of the one or more candidate data records further comprises performing one or more calculations using the data fields selected from among the one or more accepted data records.

10. The method of claim 1, wherein the creation of the one or more qualifying data records further comprises performing one or more calculations using the data fields selected from among the one or more candidate data records.

11. The method of claim 1, wherein the one or more qualifying records are used in a loan origination process.

12. The method of claim 1, wherein the ledger comprises an audit record.

13. The method of claim 1, wherein the method is performed by a distributed computing application allowing enrichment of the same plurality of data records by multiple processes in parallel.

14. The method of claim 1, wherein the method is performed by a distributed computing application allowing enrichment of multiple pluralities of data records in parallel.

15. The method of claim 1, wherein at least one source data record comprises direct income data from the applicant or a financial institution of the applicant.

16. The method of claim 1, wherein at least one source data record comprises direct income data from a financial institution of the applicant.

17. A computer-implemented system comprising: a digital processing device comprising: at least one processor, an operating system configured to perform executable instructions, a memory, and a computer program including instructions executable by the digital processing device to create a data record enrichment application for a loan origination data set for an applicant, the application comprising:

a) a software module maintaining an immutable ledger recording a current state of the data set, the current state comprising a log of each state having existed in the enriching process, the ledger allowing the process to be replicated under alternative data record selection criteria without loss of selection options;

b) a software module receiving a plurality of source data records pertaining to income, assets, liabilities, or credit worthiness for the loan applicant, each source data record comprising multiple data fields, each source data record comprising data fields at least partially overlapping with the data fields of at least one other source data record, each source data record comprising a unique source data record identifier;

c) a software module allowing reductive selection of a plurality of data fields from among the plurality of source data records to enrich the quality of the data set, compact the data set, and compile one or more accepted data records, each selected data field in an accepted data record comprising the best known data from among the plurality of source data records and retaining an association with a relevant source data record identifier and a reason for its selection, each accepted data record comprising a unique accepted data record identifier, and recording, to the immutable ledger, the current state of the data set comprising each selected data field in each accepted data record, the relevant source data record identifier, and the reason for its selection;

d) a software module allowing reductive selection of a plurality of data fields from among the one or more accepted data records to further enrich the quality of the data set, further compact the data set, and create one or more candidate data records, each selected data field in a candidate data record retaining an association with a relevant accepted data record identifier and a reason for its selection, each candidate data record comprising a unique candidate data record identifier, and recording, to the immutable ledger, the current state of the data set comprising each selected data field in each candidate data record, the relevant accepted data record identifier, and the reason for its selection;

e) a software module allowing reductive selection of a plurality of data fields from among the one or more candidate data records to create one or more qualifying data records, each selected data field in a qualifying data record retaining an association with a relevant candidate data record identifier and a reason for its selection, and recording, to the immutable ledger, the current state of the data set comprising each selected data field in each qualifying data record, the relevant candidate data record identifier, and the reason for its selection; and f) a software module utilizing the state data of the immutable ledger to reverse each selective reduction of the enrichment process to obtain the plurality of source data records and recommissioning each selective reduction of the enrichment process under alternative data record selection criteria.

18. The system of claim 17, wherein at least one source data record comprises direct credit reporting data from a third-party vendor.

19. The system of claim 17, wherein the ledger comprises an audit record.

20. The system of claim 17, wherein the data record enrichment application is implemented by a distributed computing application allowing enrichment of the same plurality of data records by multiple processes in parallel.

21. The system of claim 17, wherein the data record enrichment application is implemented by a distributed computing application allowing enrichment of multiple pluralities of data records in parallel.

22. The system of claim 17, wherein the application further comprises a software module identifying conflict at a partially overlapping data field and presenting all available values for the partially overlapping data field.

23. The system of claim 17, wherein at least one source data record comprises direct income data from a financial institution of the applicant.

24. Non-transitory computer-readable storage media encoded with a computer program including instructions executable by a processor to create a data record enrichment application for a loan origination data set for an applicant, the application comprising:

a) a software module maintaining an immutable ledger recording a current state of the data set, the current state comprising a log of each state having existed in the enriching process, the ledger allowing the process to be replicated under alternative data record selection criteria without loss of selection options;

b) a software module receiving a plurality of source data records pertaining to income, assets, liabilities, or credit worthiness for the loan applicant, each source data record comprising multiple data fields, each source data record comprising data fields at least partially overlapping with the data fields of at least one other source data record, each source data record comprising a unique source data record identifier;

c) a software module allowing reductive selection of a plurality of data fields from among the plurality of source data records to enrich the quality of the data set, compact the data set, and compile one or more accepted data records, each selected data field in an accepted data record comprising the best known data from among the plurality of source data records and retaining an association with a relevant source data record identifier and a reason for its selection, each accepted data record comprising a unique accepted data record identifier, and recording, to the immutable ledger, the current state of the data set comprising each selected data field in each accepted data record, the relevant source data record identifier, and the reason for its selection;

d) a software module allowing reductive selection of a plurality of data fields from among the one or more accepted data records to further enrich the quality of the data set, further compact the data set, and create one or more candidate data records, each selected data field in a candidate data record retaining an association with a relevant accepted data record identifier and a reason for its selection, each candidate data record comprising a unique candidate data record identifier, and recording, to the immutable ledger, the current state of the data set comprising each selected data field in each candidate data record, the relevant accepted data record identifier, and the reason for its selection;

e) a software module allowing reductive selection of a plurality of data fields from among the one or more candidate data records to create one or more qualifying data records, each selected data field in a qualifying data record retaining an association with a relevant candidate data record identifier and a reason for its selection, and recording, to the immutable ledger, the current state of the data set comprising each selected data field in each qualifying data record, the relevant candidate data record identifier, and the reason for its selection; and f) a software module utilizing the state data of the immutable ledger to reverse each selective reduction of the enrichment process to obtain the plurality of source data records and recommissioning each selective reduction of the enrichment process under alternative data record selection criteria.

25. The media of claim 24, wherein at least one source data record comprises direct credit reporting data from a third-party vendor.

26. The media of claim 24, wherein the ledger comprises an audit record.

27. The media of claim 24, wherein the data record enrichment application is implemented by a distributed computing application allowing enrichment of the same plurality of data records by multiple processes in parallel.

28. The media of claim 24, wherein the data record enrichment application is implemented by a distributed computing application allowing enrichment of multiple pluralities of data records in parallel.

29. The media of claim 24, wherein the application further comprises a software module identifying conflict at a partially overlapping data field and presenting all available values for the partially overlapping data field.

30. The media of claim 24, wherein at least one source data record comprises direct income data from a financial institution of the applicant.

\* \* \* \* \*